United States Patent [19]
Coulthard

[11] Patent Number: 6,041,242
[45] Date of Patent: Mar. 21, 2000

[54] PORTABLE EMERGENCY RESPONSE COMMUNICATIONS SYSTEM AND METHOD

[76] Inventor: Steve M. Coulthard, P.O. Box 871830, Wasilla, Ak. 99687

[21] Appl. No.: 08/876,257

[22] Filed: Jun. 16, 1997

Related U.S. Application Data

[60] Provisional application No. 60/020,039, Jun. 21, 1996, and provisional application No. 60/034,138, Dec. 30, 1996.

[51] Int. Cl.$^7$ .................................................. H04Q 7/20
[52] U.S. Cl. .......................... 455/575; 455/347; 455/349; 455/351
[58] Field of Search ................................. 455/572, 573, 455/575, 347, 349, 351, 404, 90

[56] References Cited

U.S. PATENT DOCUMENTS

| | | | |
|---|---|---|---|
| D. 282,169 | 1/1986 | Larson | D14/65 |
| D. 295,511 | 5/1988 | Scheid et al. | D13/8 |
| D. 300,132 | 3/1989 | Culbertson et al. | D13/8 |
| D. 301,228 | 5/1989 | Culbertson et al. | D13/8 |
| D. 329,040 | 9/1992 | Seki et al. | D13/103 |
| D. 330,693 | 11/1992 | Watanabe et al. | D13/103 |
| D. 339,322 | 9/1993 | Seki et al. | D13/103 |
| D. 348,043 | 6/1994 | Hamilton et al. | D13/103 |
| D. 348,044 | 6/1994 | Alexandres et al. | D13/103 |
| D. 348,649 | 7/1994 | Richards et al. | D13/118 |
| D. 355,637 | 2/1995 | Tracy et al. | D13/103 |
| D. 356,065 | 3/1995 | Alexandres et al. | D13/103 |
| 3,963,972 | 6/1976 | Todd | 320/2 |
| 4,057,757 | 11/1977 | Darden, Jr. | 325/16 |
| 4,126,863 | 11/1978 | Kolwaite | 343/702 |
| 4,138,681 | 2/1979 | Davidson et al. | 343/702 |
| 4,142,172 | 2/1979 | Menard | 340/81 R |
| 4,300,087 | 11/1981 | Meisner | 320/2 |
| 4,331,883 | 5/1982 | Vitaloni | 307/150 |
| 4,376,250 | 3/1983 | Baker, Jr. et al. | 307/150 |
| 4,491,978 | 1/1985 | Nagata et al. | 455/338 |
| 4,495,649 | 1/1985 | Iwata | 455/115 |
| 4,608,500 | 8/1986 | Togawa | 307/72 |
| 4,620,111 | 10/1986 | McArthur et al. | 307/150 |
| 4,627,107 | 12/1986 | Hohlfeld et al. | 455/11 |
| 4,641,370 | 2/1987 | Oyamada | 455/348 |
| 4,661,992 | 4/1987 | Garay et al. | 455/89 |
| 4,673,861 | 6/1987 | Dubovsky et al. | 455/100 |
| 4,702,715 | 10/1987 | Winick | 441/80 |
| 4,709,201 | 11/1987 | Schaefer et al. | 320/2 |
| 4,748,685 | 5/1988 | Rozanski, Jr. | 455/218 |
| 4,749,908 | 6/1988 | Stifter | 315/86 |
| 4,790,000 | 12/1988 | Kinoshita | 379/59 |
| 4,879,755 | 11/1989 | Stolarczyk et al. | 455/3 |
| 4,920,353 | 4/1990 | Mori et al. | 343/702 |
| 4,945,255 | 7/1990 | Suzuki et al. | 307/17 |
| 4,985,806 | 1/1991 | Mazzullo et al. | 361/392 |
| 4,987,360 | 1/1991 | Thompson | 320/6 |
| 4,998,095 | 3/1991 | Shields | 340/574 |
| 5,019,767 | 5/1991 | Shirai et al. | 320/2 |
| 5,023,932 | 6/1991 | Wakana | 455/34 |
| 5,046,131 | 9/1991 | Takahashi et al. | 455/90 |
| 5,121,504 | 6/1992 | Toko | 455/90 |
| 5,206,097 | 4/1993 | Burns et al. | 429/90 |
| 5,220,269 | 6/1993 | Chen et al. | 320/2 |
| 5,227,804 | 7/1993 | Oda | 343/702 |
| 5,265,158 | 11/1993 | Tattari | 379/433 |
| 5,287,554 | 2/1994 | Furuno | 455/89 |
| 5,349,480 | 9/1994 | Takao | 360/74.1 |
| 5,359,340 | 10/1994 | Yokota | 343/792 |
| 5,369,565 | 11/1994 | Chen et al. | 363/146 |

(List continued on next page.)

*Primary Examiner*—Wellington Chin
*Assistant Examiner*—Yeman Woldetatios
*Attorney, Agent, or Firm*—Santangelo Law Offices, P.C.

[57] ABSTRACT

An emergency response communications system including a system capable of being transported and may include a plurality of radio connection ports with special latching multi-pronged ports, a computer power source outlet, overload protector, battery condition indicator, master power switch, at least one portable gel cell DC battery, various power circuits throughout the system, a resistant case able to withstand a substantial impact load to protect the gel cell DC battery, a mobile frame, a DC to AC inverter, a battery charger, a fax machine power outlet, a battery condition indicator, and possibly, a light mounted to the case and a retractable antenna mounted to the case. In some embodiments, a variety of features may be incorporated into the case and may be transported without the frame.

38 Claims, 20 Drawing Sheets

U.S. PATENT DOCUMENTS

| | | | |
|---|---|---|---|
| 5,438,701 | 8/1995 | Yamada et al. | 455/89 |
| 5,444,867 | 8/1995 | Marui et al. | 455/89 |
| 5,465,400 | 11/1995 | Norimatsu | 455/127 |
| 5,487,181 | 1/1996 | Dailey et al. | 455/89 |
| 5,534,872 | 7/1996 | Kita | 342/146 |
| 5,539,925 | 7/1996 | Yli-Kotila et al. | 455/38.3 |
| 5,542,116 | 7/1996 | Schellinger | 455/343 |
| 5,548,823 | 8/1996 | Hirasawa et al. | 455/89 |
| 5,548,824 | 8/1996 | Inubushi et al. | 455/90 |
| 5,548,827 | 8/1996 | Hanawa et al. | 455/129 |
| 5,554,896 | 9/1996 | Hogan | 307/150 |
| 5,563,005 | 10/1996 | Ohtani et al. | 429/96 |
| 5,566,364 | 10/1996 | Mizoguchi et al. | 455/132 |
| 5,584,055 | 12/1996 | Murui et al. | 455/89 |
| 5,585,807 | 12/1996 | Takei | 343/702 |
| 5,627,449 | 5/1997 | Fujiki | 320/106 |
| 5,628,054 | 5/1997 | Osaka | 455/575 |

| Fig. 1a | Fig. 1b | Fig. 1c |

Fig. 1

PORTABLE EMERGENCY RESPONSE COMMUNICATIONS SYSTEM AND METHOD

This application claims the benefit of U.S. Provisional Application No. 60/020,039 filed Jun. 21, 1996 and U.S. Provisional Application No. 60/034,138 filed Dec. 30, 1996.

This invention relates generally to the field of emergency communications. Specifically, it addresses systems and methods to power, transport, and allow use of portable emergency communications equipment in environments where such equipment might be needed.

I. BACKGROUND

Since the beginning of time there have been disasters and people have seen where emergency actions need to be taken. Many lives have been lost due to lack of proper communications. Property has been destroyed before people realized the extent of the disaster, especially if the disaster was a spreading fire and the like. In other cases, people in remote locations have needed medical attention along with temporary housing. In a disaster area, there are always relatives, friends, and loved ones involved. Even people inside the area have loved ones outside the affected area.

In responding to a disaster need, timeliness may be extremely important. Supplies may be needed and, with the advent of the helicopter transports, can be taken to remote locations quickly. However, communications must be effective to direct such efforts.

Historically, beginning over a century ago, telegraphs were used for communication of disasters which later were largely replaced with telephones. However, many times in a disaster area, the telegraph, telephone lines, or other communications lines were destroyed. Early in the $20^{th}$ century, the ham shortwave radio operators became able to transmit and receive distress signals using Morse Code. Initially, the range of communication was impaired and it required a chain of ham operators to relay the information. Today, with current technology, ham operators are able to communicate around the world and are generally the first to communicate with the outside world in cases of disaster. In recent times, the mobile telephone has gained acceptance. However, it as well as the other equipment, requires local portable power that may operate independent of other power sources to be a more effective emergency aid.

For instance, the Red Cross, known worldwide for its disaster relief depends many times upon power lines carrying AC voltage, such as a 110 volt AC system in the U.S., to power the needed radio equipment, to operate computers, and lighting. If the 110 volt AC system fails, some radio equipment may be operated from a car battery, but then the car may need to run to ensure that the charge on the battery is maintained. In other cases, a standby generator may be operational to assist in the 110 volt needs, but at times even the standby generator may not operate.

The inventor's personal experience in May, 1996 was at a disastrous fire at Big Lake, Ak. The fire had a radius of 32 miles involving a residential and commercial area. This fire was one of the worst disasters in Alaska's history. The Red Cross established an evacuation center at a local high school with computers and ham radios that were placed in operation. Everything operated well for several hours. However, with the widespread area of the fire, power outages occurred and the computers and radios along with the lighting were in a state of failure. The school had a standby generator, but it failed to start, because the fuel tank had been drained to ensure fresh fuel would be placed in it for the school season in 1996 and 1997. Without the 110 volt AC power available in the area, the service stations and fuel supply companies could not pump the needed fuel. Shortly after the fire started, another problem occurred when all the cell phones were rendered useless. With downed telephone lines and no readily available power for recharging, the cell phones were inoperable. The power outage lasted for nearly three hours, resulting in placing all those involved under undue hazardous conditions. In several instances, the fire was unable to be controlled and went beyond the hopeful fire breaks, perhaps partially at least because of the lack of communication.

It is interesting that in over 100 years of organized disaster relief that a satisfactory portable emergency power system has not emerged. Obviously, the need is great. Yet, it appears that no invention has harnessed the various needs into a small, compact, and readily accessible system. Frankly, this is somewhat surprising given the state of the need and the readily available various components to assemble such a system. What is needed is the system and method such as described and claimed in the present patent. What is needed is an emergency response communications system capable of operating for an extended time period the multiple units typically involved in emergency response and disaster related systems that can be set up within a few minutes, if not a few seconds, and may be portable to remote areas. Such a system could be used in evacuation centers, control centers for disaster preparedness, search and rescue teams, base camps, forest fire control, ski patrols, and even mountain climbers and hunting and fishing camps.

Yet, oddly, the arrangement of various elements for a total system simply appears to have escaped the auspices of the various people who would have the greatest need. While in some cases, it may be recognized that the portable power unit would be advantageous, no one has solved the various needs to the extent that the present invention solves. For instance, there are some commercial units of small batteries with limited power capacity to run small short range ham radio units. These units seem to be small almost "Toy-like" in that they can be dropped, broken and otherwise damaged from the construction and plastic case. In some instances, this type of portable power source would not have enough power to operate a 2 meter mobile radio for the needed time. Thus, a "runner" is often necessary. This step normally slows the communications down in an emergency situation and places additional safety risk to the runner. In many systems, even the smaller hand held HT radios might last for just a few hours. For instance, in a power system with a 7 amp hour battery, the HT radio under emergency conditions lasted only two to four hours in the inventor's experience. In some cases, even a larger unit using a small car battery is available. However, even it appears very restricted in its capabilities. For instance, even it misses the point of multiple outlets and only supplies one car cigarette lighter type connection for limited use of the needed equipment. Thus, while it may be apparent that portable power is desired, those in this field, other than this invention, stopped with the concept of simply providing a battery in a nondurable, nonemergency equipped unit which apparently did not operate sufficiently multiple equipment needs and heavy duty radio needs.

Furthermore, the present invention allows the portable use of radios that were previously considered somewhat fixed to abase station because of the large power requirements. For instance, the HF radio is typically the most powerful radio used by ham operators and will require up to 1500 watts. Typically, its requirements were met by standby generators if the 110 volt AC source power lines went down. Normally the HF radio requires a base station and a special antenna at a fixed location. Thus, it may not have viably considered portable until the present invention.

Until the present invention, there remained a great need in the emergency communications field of a compact, portable, emergency response communications system specifically designed to provide the various aspects of heavy duty and perhaps multiple use of a variety of equipment from a single power system. The present invention satisfies those needs.

Thus, while there was a long felt but unsatisfied need for this invention, as will be shown in the detailed description, the needed implementing arts and elements have long been available with the elegant simplicity of the present invention. As stated above, those with the greatest need appreciated that a problem existed and simply had not realized how to solve the problem. In some limited cases, those with skill in the art attempted to solve the problem by supplying a limited use power unit, yet appear to have missed the over all picture in satisfying the real needs of those in disaster relief situations needing emergency communications. Interestingly, in the experimental field trials of this invention, the results have been outstanding. Testimonials of those who have tried the equipment have stated that they do not wish to return the unit and to "please don't expect to see it back any time soon," because of their enthusiasm of the unit. The systems, in their various embodiments, have an elegant simplicity that is readily repairable, can be operated with little to no training, and can operate large power requirement radios such as a two meter mobile radio requiring 50 watts for at least a week's time with normal use and no recharging. It can withstand a lot of abuse driving through fields and over country roads with its strong and durable metal case. Its connections are sturdy and can endure a substantial amount of wear and tear under emergency conditions. Additionally, it can power hand-held transceivers on scan for 24 hours a day for over a month and appears to not drop in voltage substantially.

Those who have an interest in these systems such as the Red Cross, National Guard, Forest Service, Coast Guard, have expressed strong interest in this invention. They have commented that they have never seen something like this before. Such interest is partially due to the disbelief and incredulity on the part of those skilled in the art that the invention could perform so well under such a variety of conditions and even operate multiple power supplies simultaneously with such success.

II. SUMMARY OF THE INVENTION

Accordingly, the present invention provides a unique and much sought out solution to the emergency communications field. In a more elegant embodiment, the present invention includes a mobile portable emergency response communications system including:

A plurality of radio connection ports especially designed to allow connection of a large power draw HF radio and a two meter mobile radio having latching multi-pronged ports, a weather shield cover and orientation element;

A cigarette lighter-type outlet that may be used to power simultaneously with the radios, a computer, mobile cell phone, light, and other 12 volt DC units;

A plurality of overload protectors for the radio connection ports and power source outlets;

A battery condition indicator;

A master power switch;

A power indicator;

A large portable gel cell DC battery;

An impact resistant case;

A frame to support the battery and power system that may be collapsible and mobile;

Two shelves, one to support a radio, and one to support a computer;

A light to illuminate the area of the radios and in proximity to the frame support shelf;

A battery charger;

A DC to AC inverter to convert the 12 volt DC power supply to a 110 volt AC supply to use for computers, fax machines, and printers under emergency conditions; and At least two antenna mounts, generally for the two meter mobile radio and the HF radio.

All of these may be combined into a single, compact portable unit capable of being rolled or sledded to the appropriate remote location. It can be set up in approximately one minute or less to a fully operational portable emergency response communications system, suitable for emergency control centers. Furthermore, because the unit may not be directly connected to an AC power source, there may be less inherent AC noise. It has been noticed in operation of the radios that the signals may be clearer as a result. Apparently, these combinations of features has never been accomplished or made public.

In another embodiment, the emergency response communications system may include a smaller system capable of being carried and may include a plurality of radio connection ports similar to the ones described above with the special latching multi-pronged ports, a computer power source outlet, overload protectors, battery condition indicators, master power switch, at least one portable gel cell DC battery, various power circuits throughout the system, a resistant case able to withstand a substantial impact load to protect the gel cell DC battery, a DC to AC inverter, a fax machine power outlet, a lighted battery condition indicator, and possibly, a light mounted to the case and a retractable antenna mounted to the case. In one embodiment, the gel cell DC battery may be sized to power the radio connection ports, outlets, and other power sources for a continuous period of 16 hours per day for at least three days with simultaneous normal to heavy usage.

The system also includes what has been termed "mega-DC power." Apparently, the tendency among some was to use a small portable power source. The present system realizes that such a philosophy and approach is not feasible to accomplish the goals of the present invention, namely, a mega-extended time to operate emergency response communications system equipment such as radios, computers, lights, cell phones, etc. concurrently. For instance, this may include a gel cell DC battery rated for 600 amp hours and could operate even the large HF radio for extended periods.

Another aspect of the present invention includes hand disconnectable radio connection ports including a latching multi-pronged radio connection port. Apparently those with skill in the art typically purchase a radio, such as a HF radio with bare wire leads. (Again, this may be because until the present invention, such radios may have been considered largely stationary at a base station and unsuitable for rapid portable disconnection. Thus, a typical operator may "hard wire" the HF radio to a more permanently mounted system.) Each person then may customize the particular lead for the given connection he has. There appears to be little uniformity. However, the present invention because of its multiple and synchronous ability to use a variety of radios and other communication equipment, provides a uniform, sturdy, impact resistant, connection port that is specifically designed for even the needs of large radios using the portable emergency response communications system. Thus, instead of being permanently attached, as a typical heavy usage, high wattage HF radio operator may be accustomed to, the present invention provides for hand disconnectable radio connection ports that will generally satisfy the needs of such a heavy usage.

Another aspect of the present invention includes customizing the portable emergency response communications system to provide a switchable and selective charge controller. This may be selected through a multiple position switch that allows direct charging capabilities in one position and allows selective charging through a selective charge controller to control the maximum level of charging to the DC battery in a second position. Commonly, it is the philosophy to recharge the battery as quickly as possible to enable the battery to become usable again in an emergency. However, the present system realizes that with the preferred particular DC power source, recharging rates may require restriction and thus specifically adapts the system to allow for such an occurrence. This increases the versatility and usefulness of the portable emergency response communications system by allowing more external power sources to recharge the system. Other embodiments are certainly possible.

Another aspect includes a recoiling retractable antenna that may be mounted to the power system. It may offer increased versatility and range and convenience to the ability to communicate longer distances.

Naturally, further goals and objects of the invention are disclosed throughout other areas of the specification and claims.

III. BRIEF DESCRIPTION OF THE DRAWINGS

Figure 6:
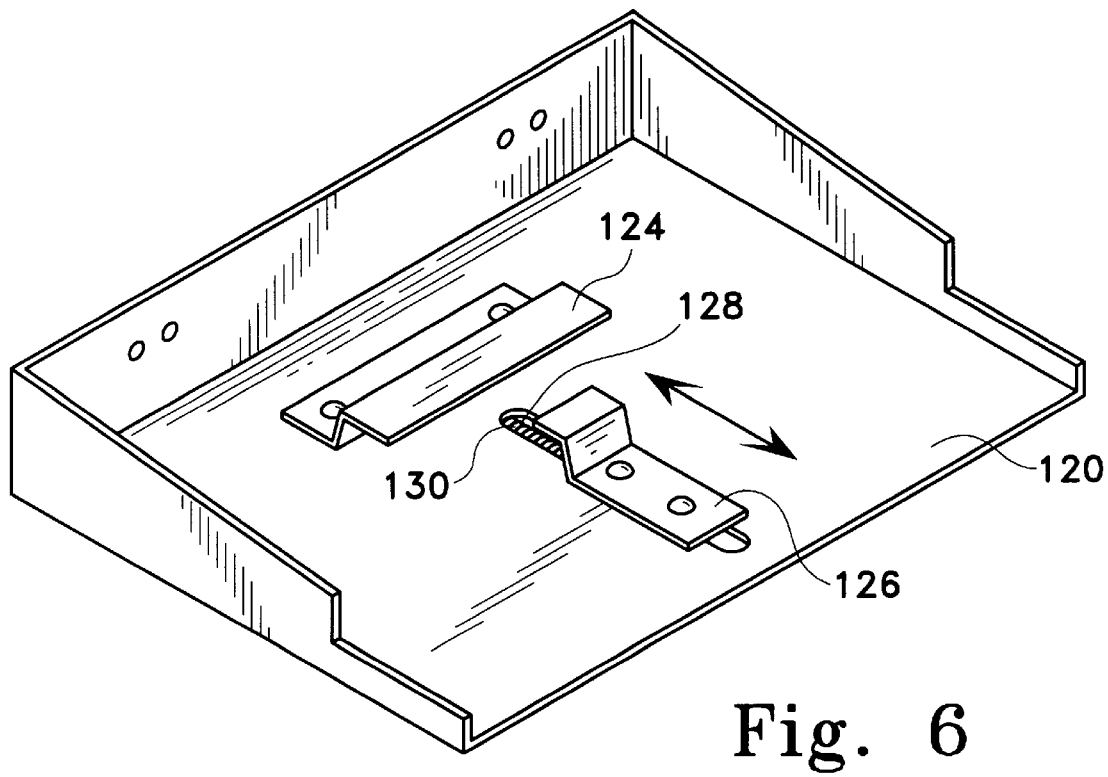
FIG. 6 shows a detail of the variable radio base restrainer in perspective view.
Figure 6A:
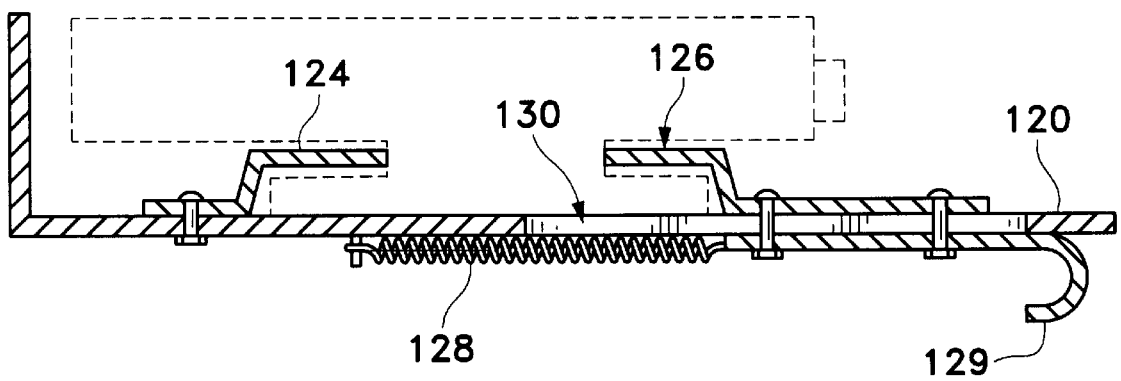

FIG. 6*a* shows a side view in more detail of the variable radio base restrainer of FIG. 6.

Figure 7:
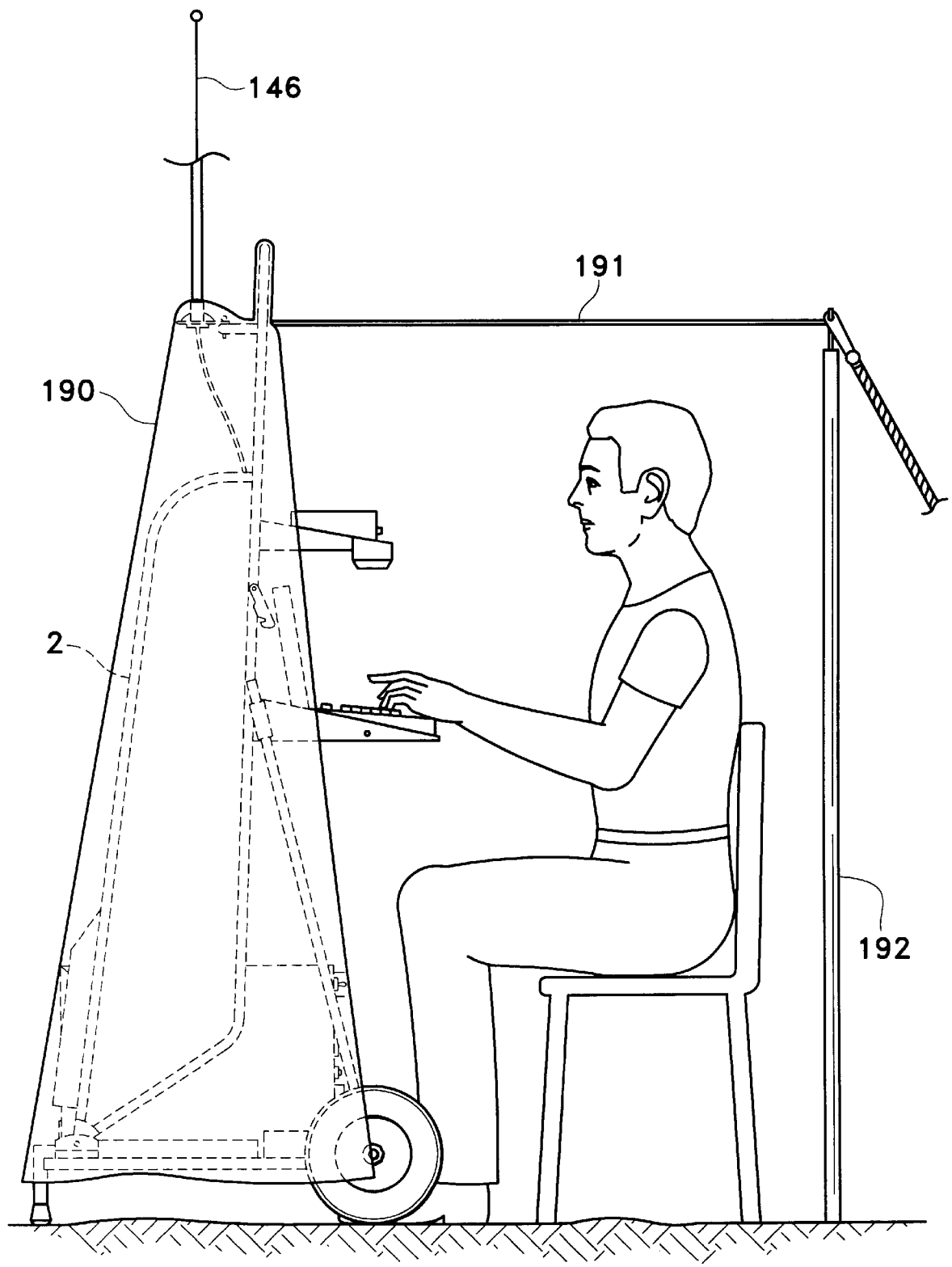

FIG. 7 shows an operator under a cover using the portable emergency response communications system.

Figure 8:
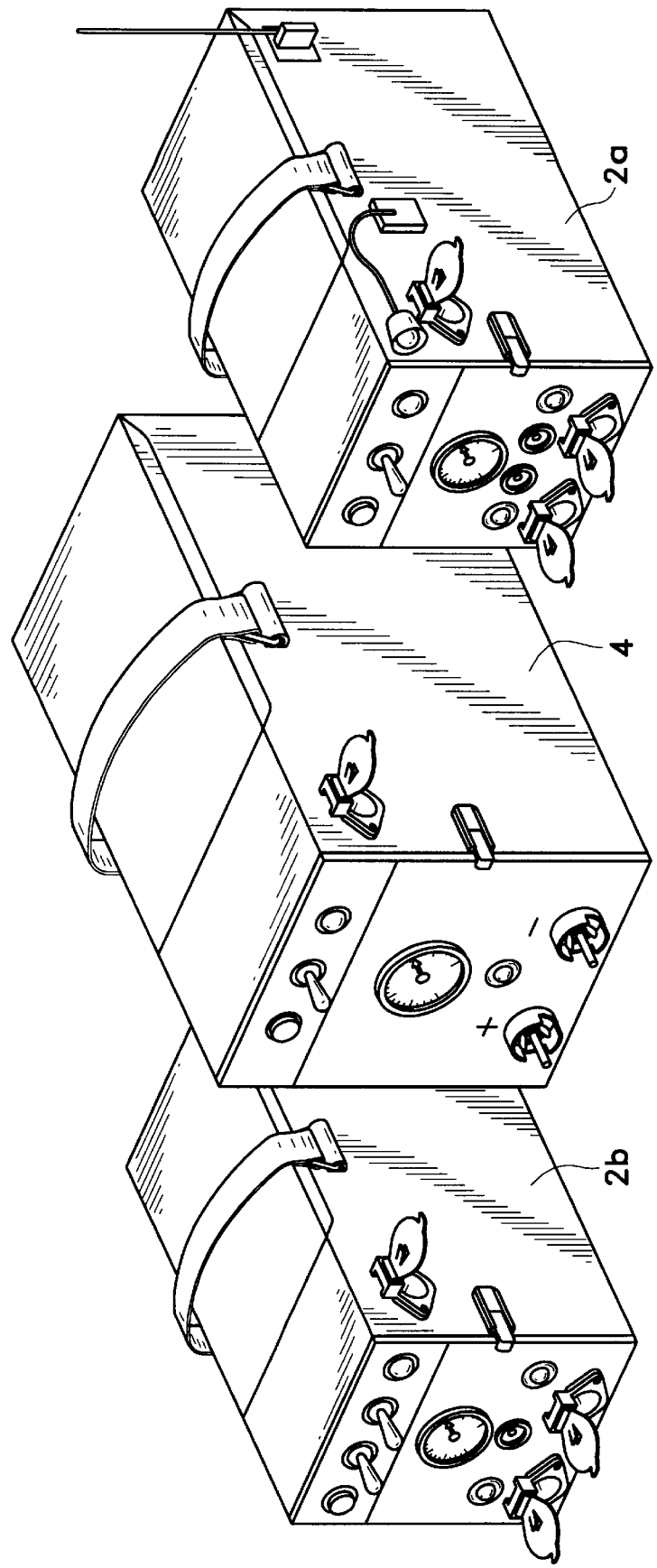

FIG. 8 shows a detail of another embodiment of the portable emergency response communications system in which the systems may be carried.

Figure 9:
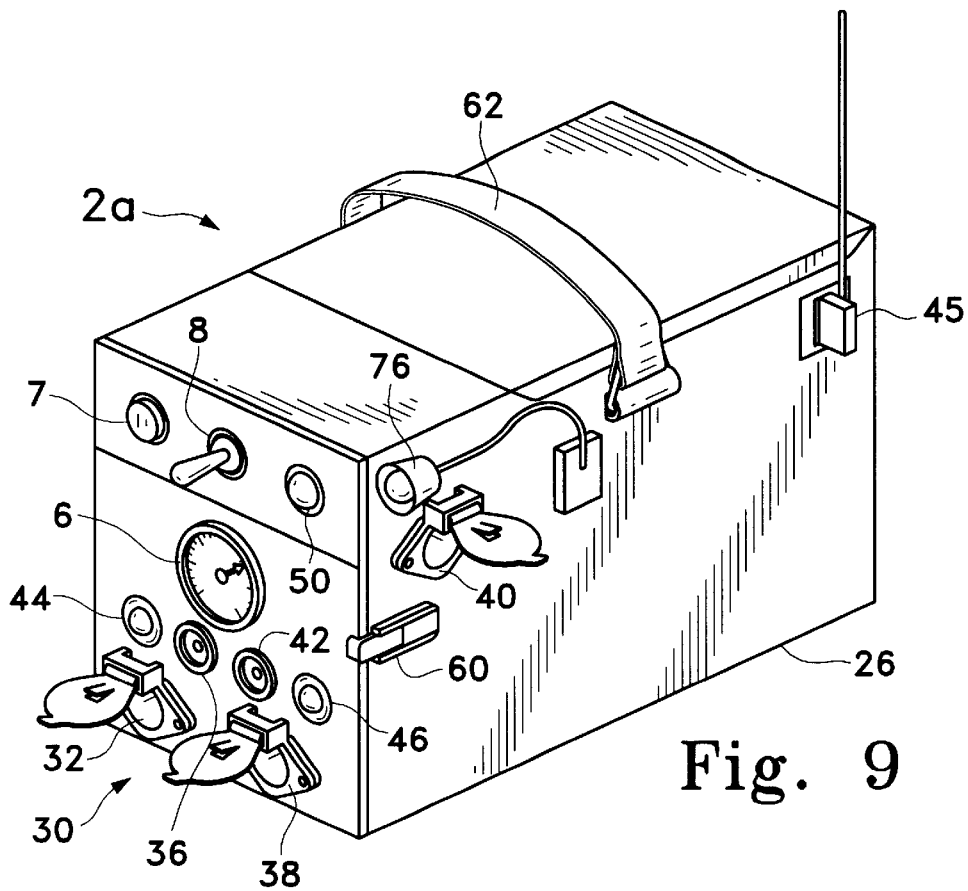

FIG. 9 shows one of the systems of FIG. 8 in more detail.

Figure 10:
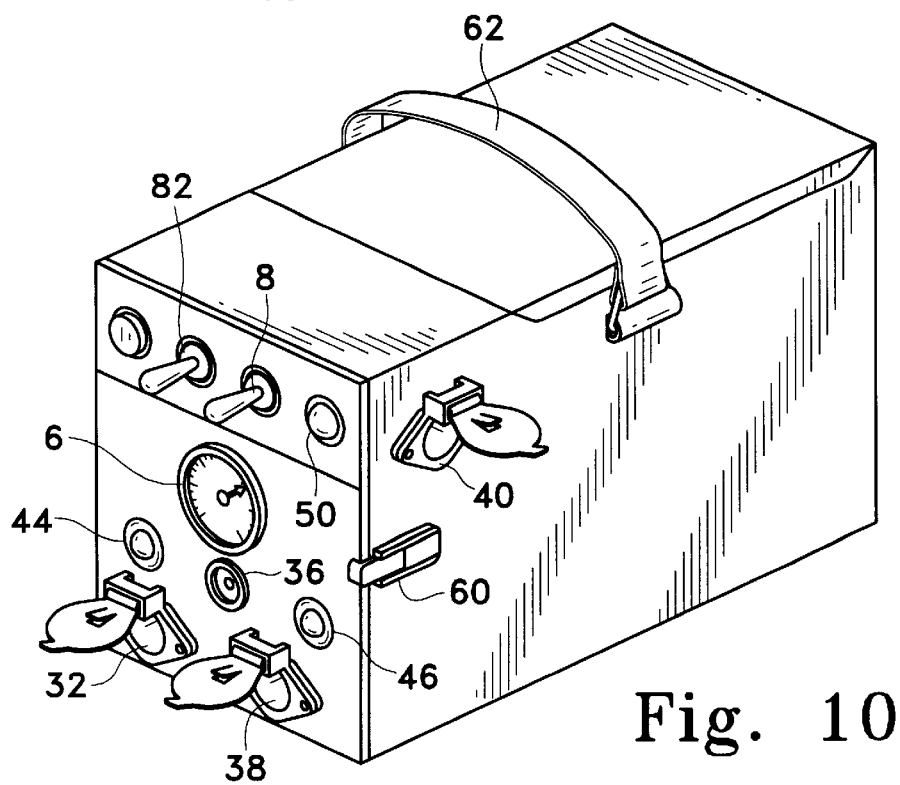

FIG. 10 shows another one of the systems of FIG. 8 in more detail.

Figure 11:
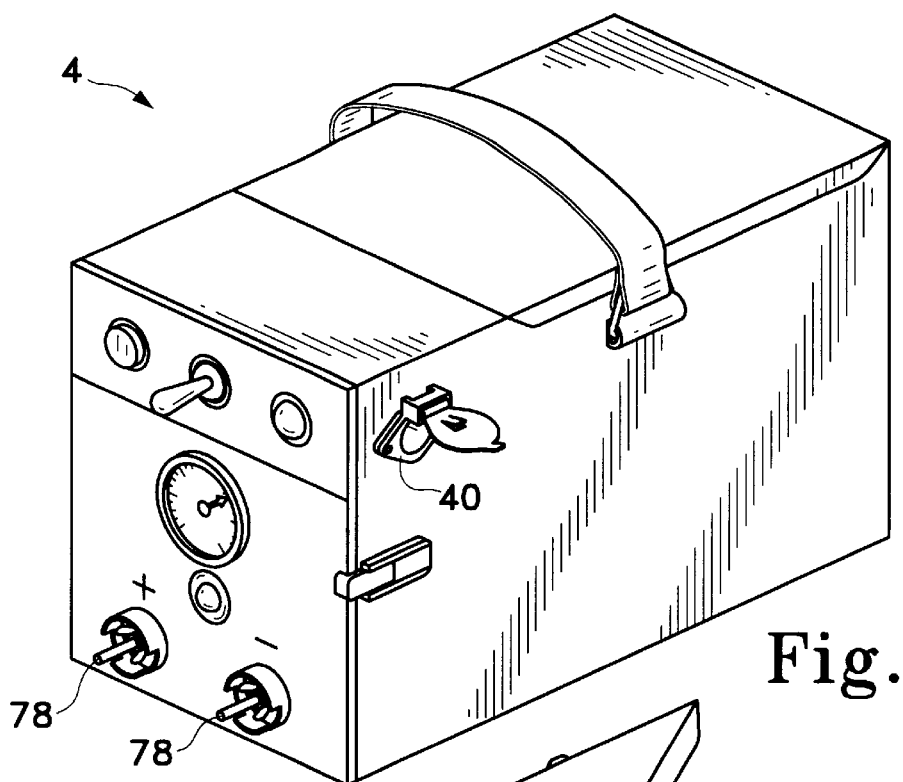

FIG. 11 shows another one of the systems of FIG. 8 in more detail.

Figure 12:
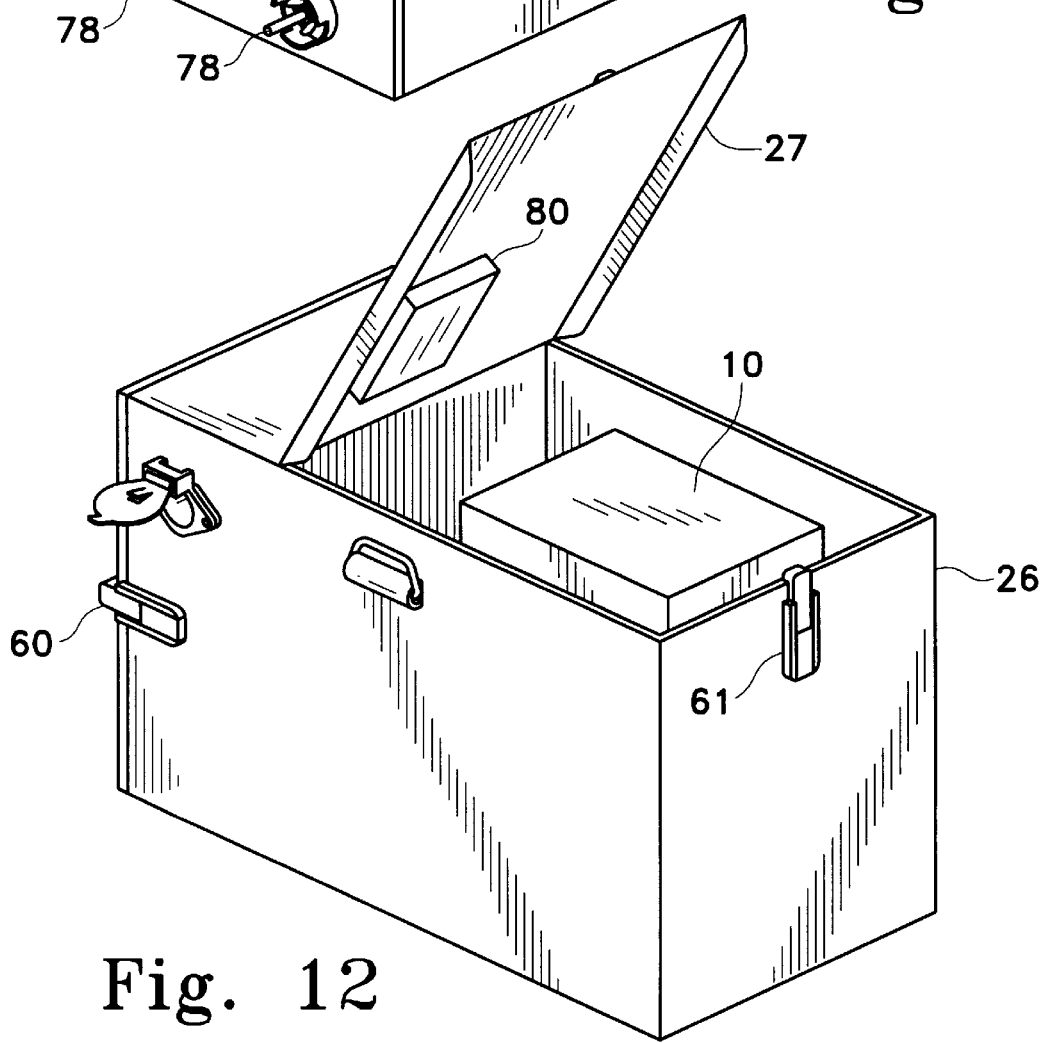

FIG. 12 shows a rear perspective view of the systems of FIG. 8.

Figure 13:
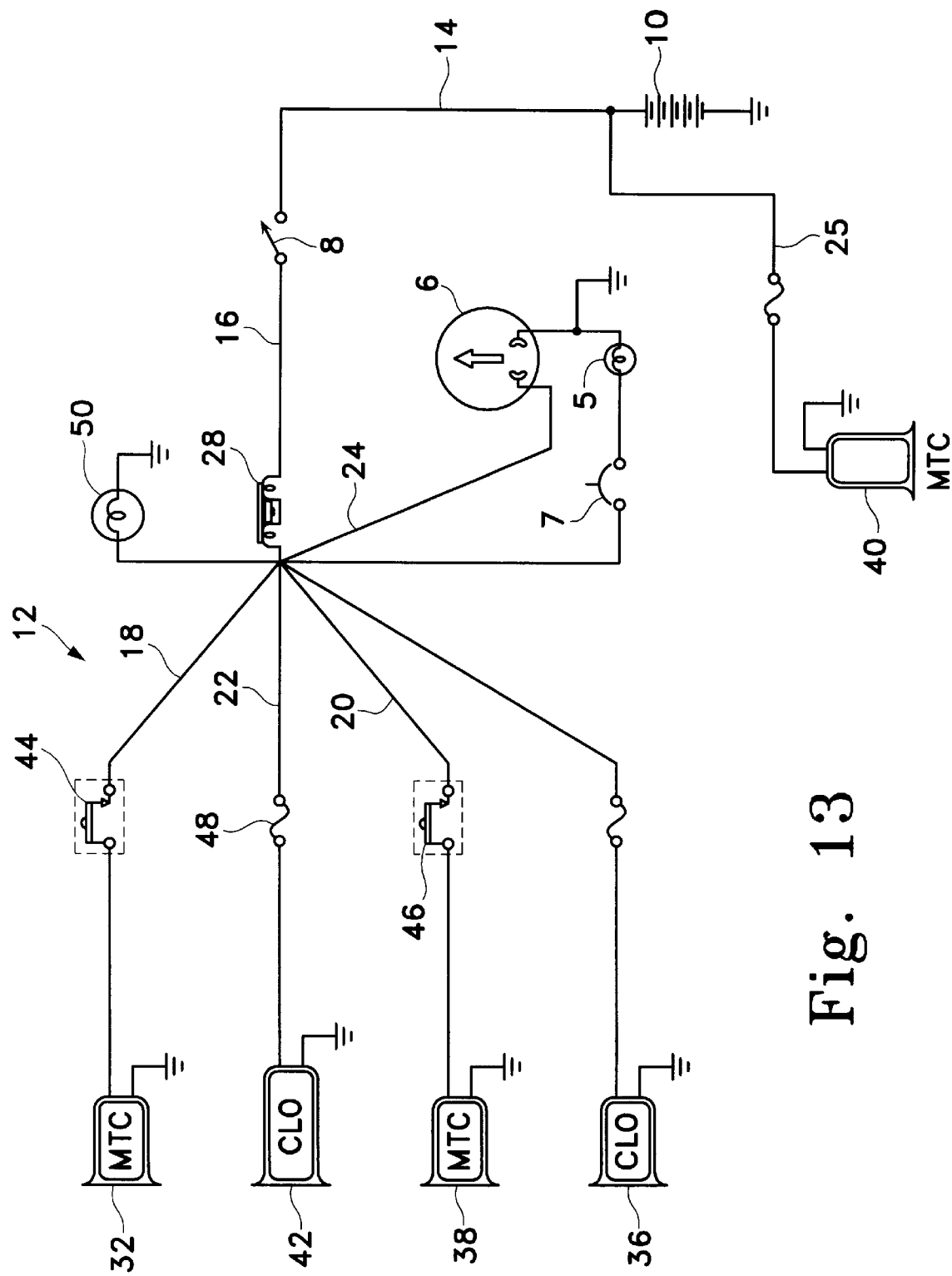

FIG. 13 shows a typical wiring diagram for one of the systems of FIG. 8.

Figure 14:
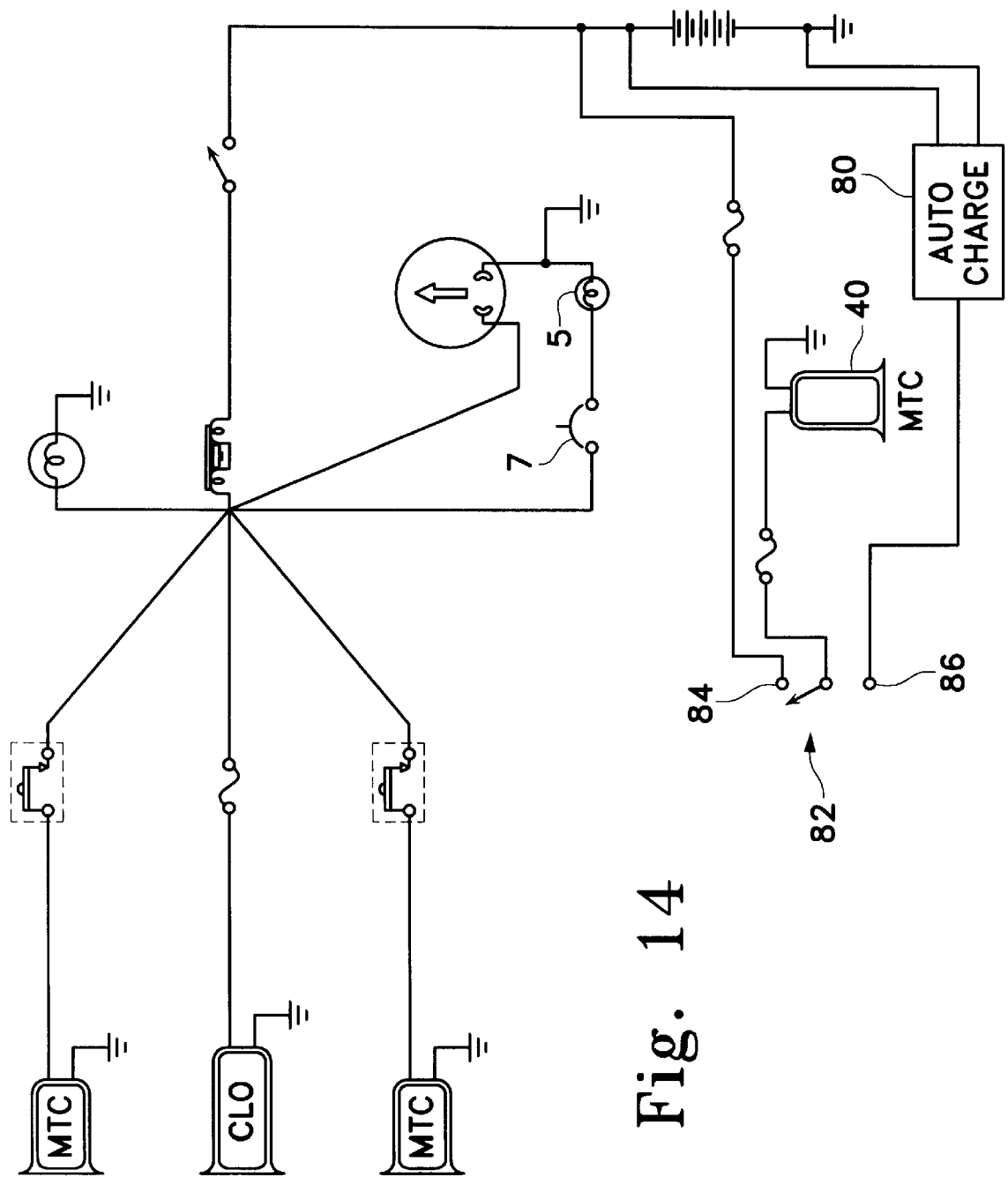

FIG. 14 shows a typical wiring diagram for another one of the systems of FIG. 8.

Figure 15:
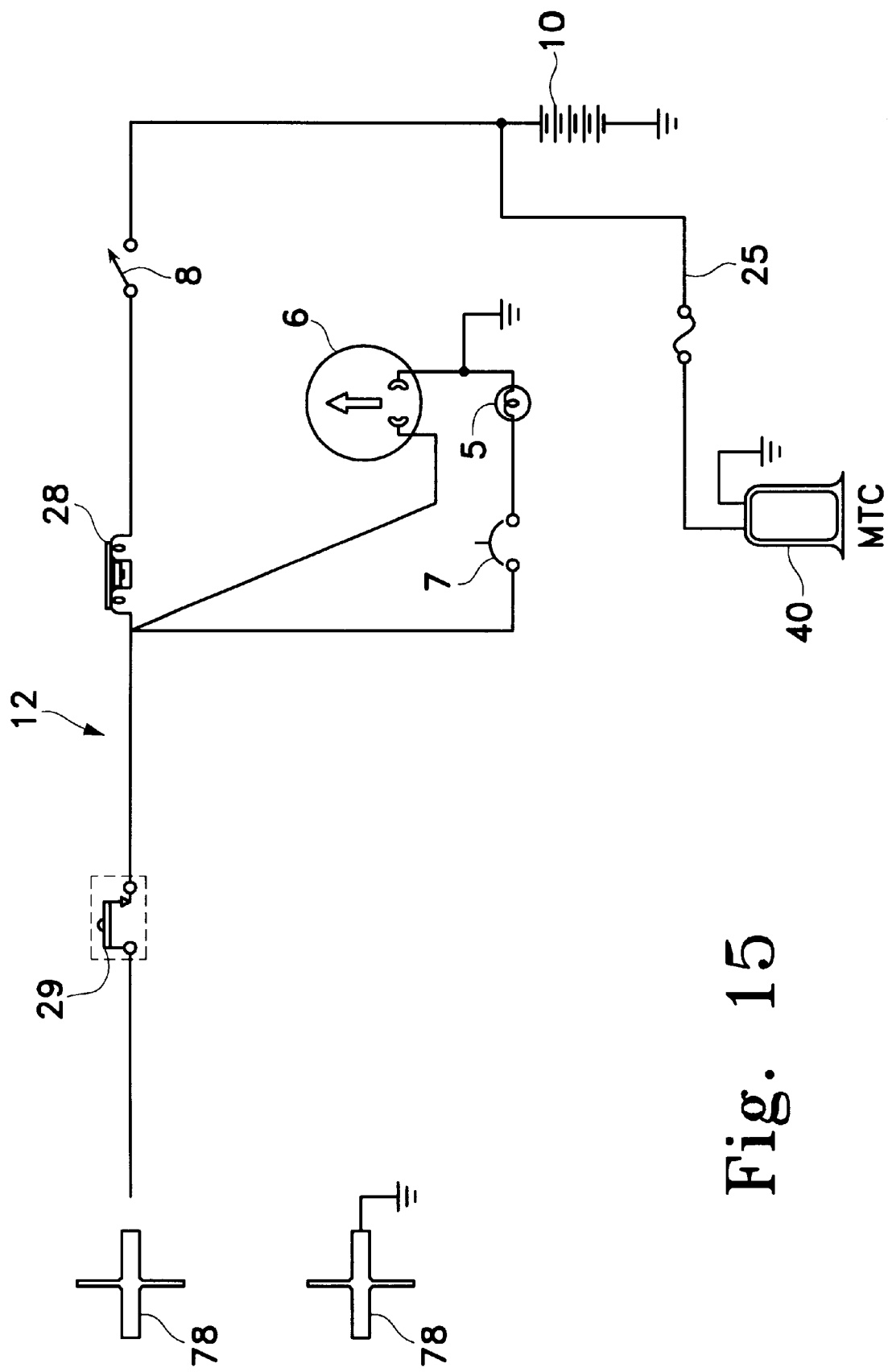

FIG. 15 shows a simplified wiring diagram for yet another one of the systems of FIG. 8.

Figure 16:
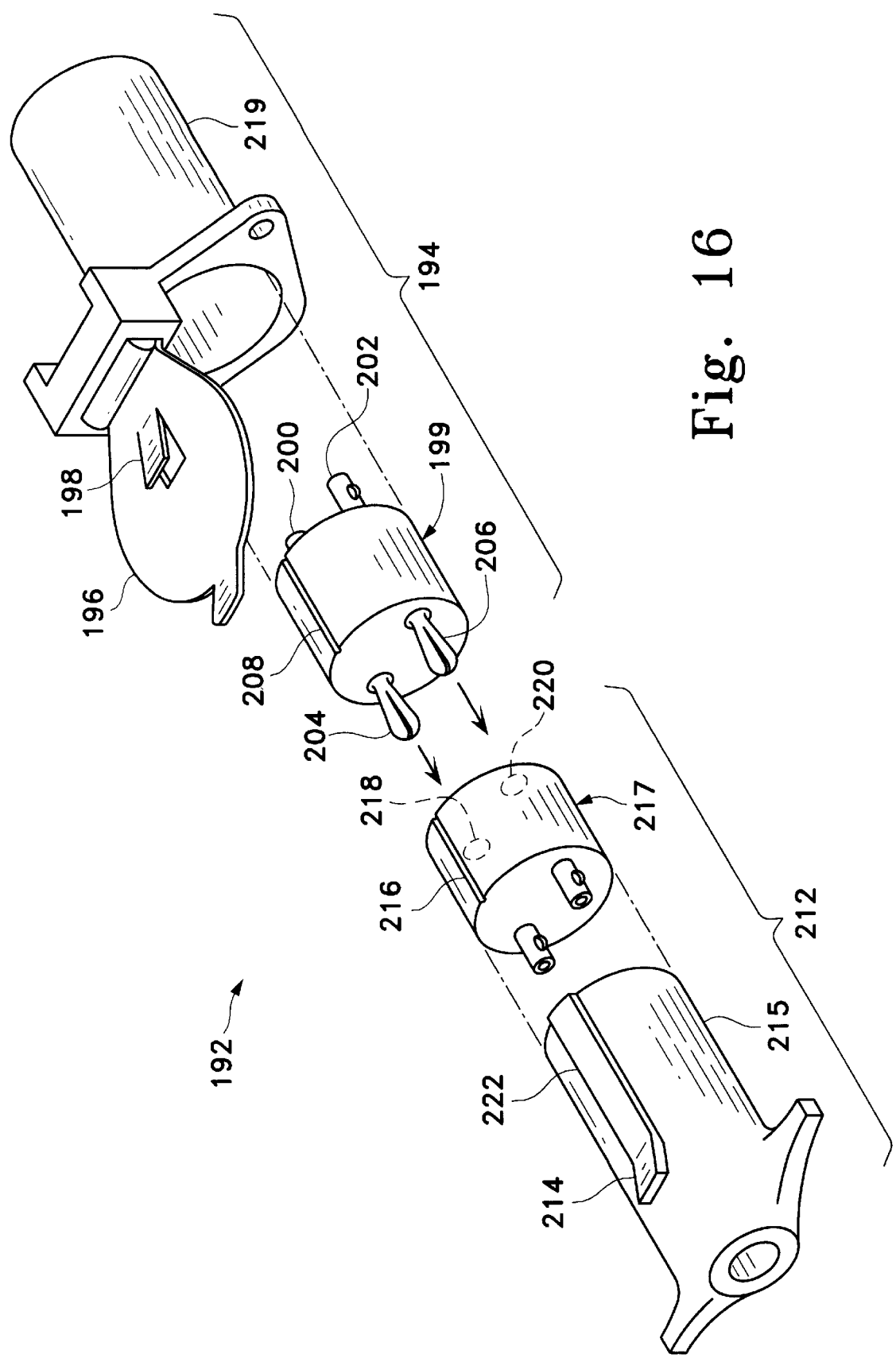

FIG. 16 shows a detailed view of the latching multi-pronged port and the corresponding connection.

Figure 17:
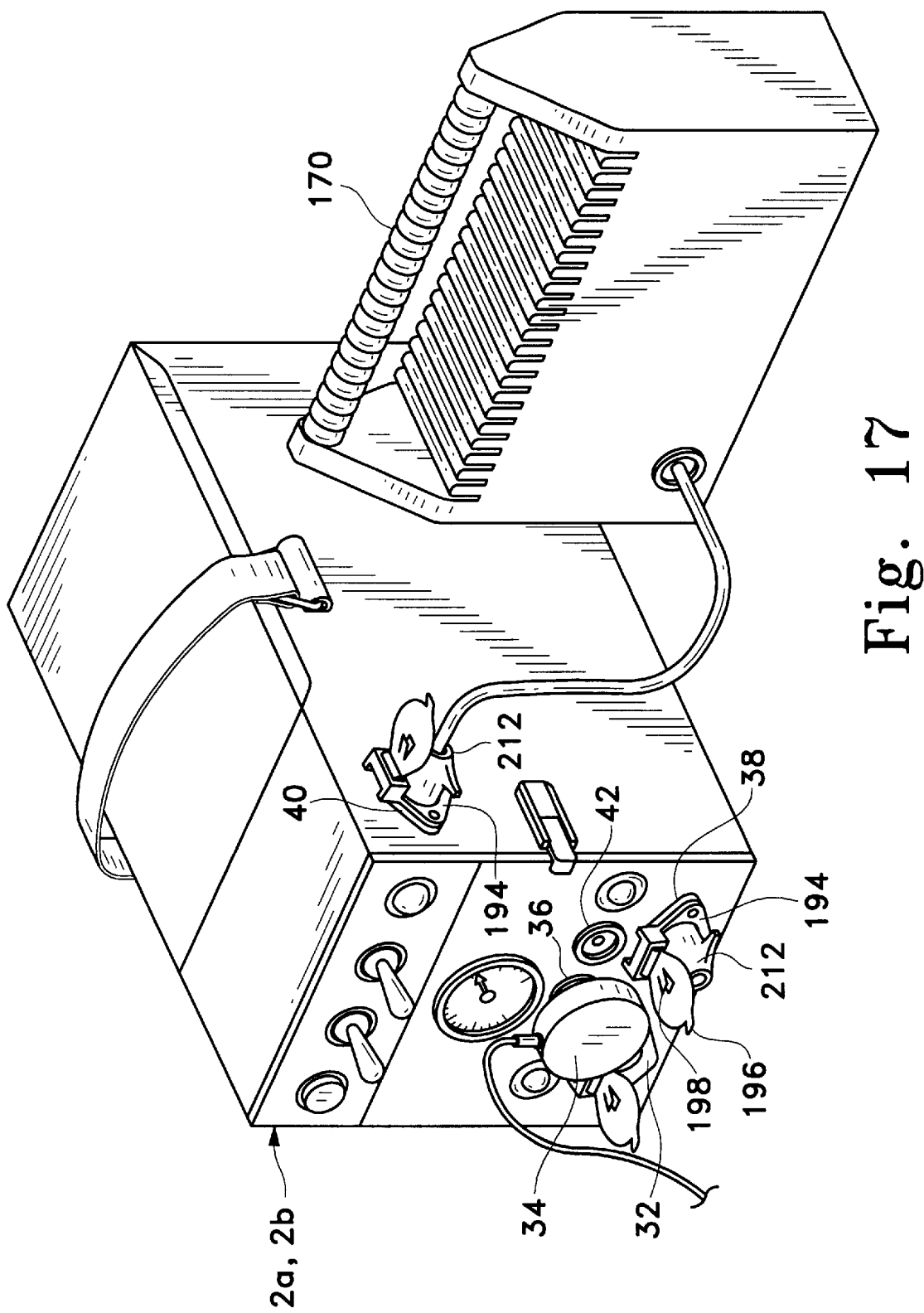

FIG. 17 shows one of the units of FIG. 6 being operated and recharged.

Figure 18:
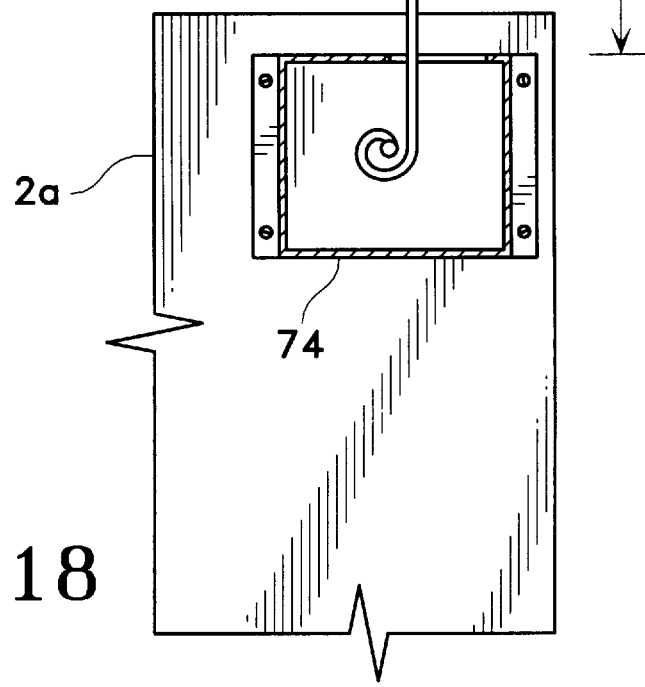

FIG. 18 shows a recoiling retractable antenna mounted to a portable emergency response communications systems case in an extended position.

Figure 19:
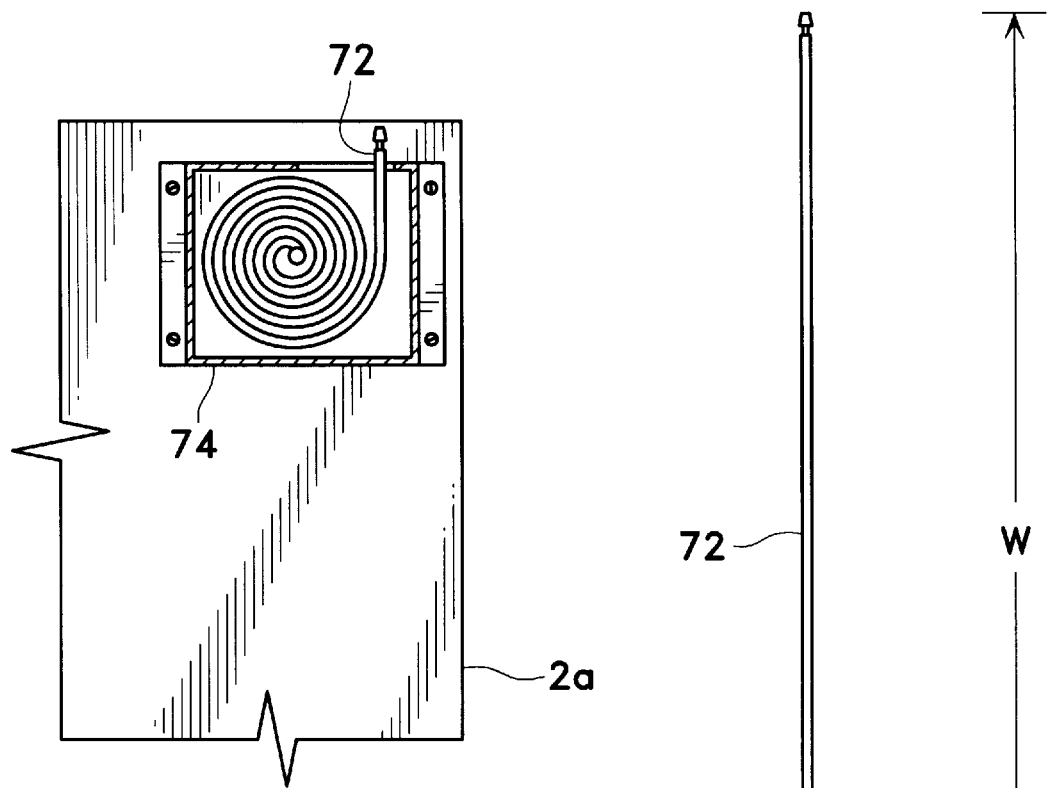

FIG. 19 shows the retractable antenna of FIG. 18 in a retracted position.

Figure 20:
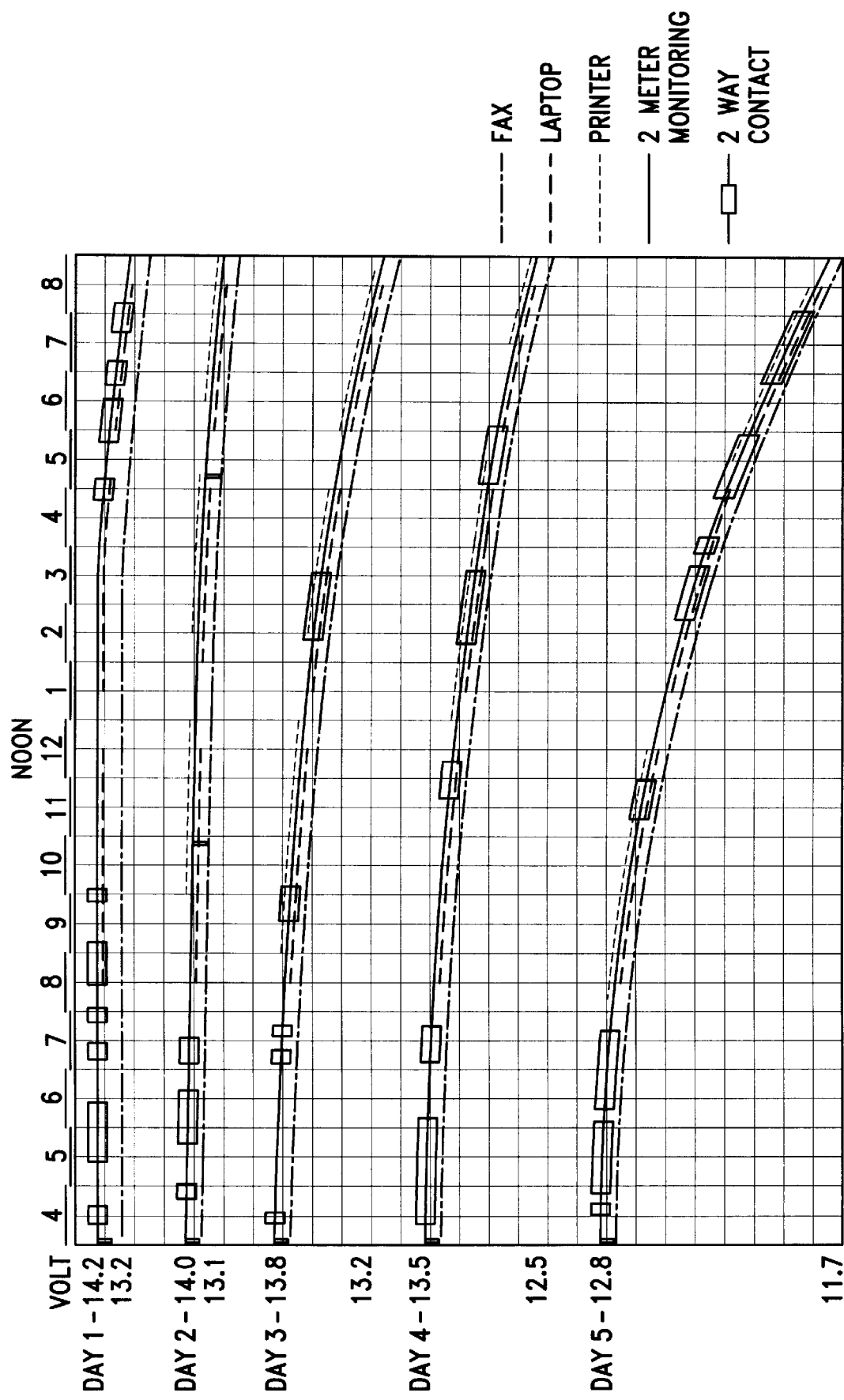

FIG. 20 shows actual test data using one embodiment of the present invention with multiple power using units connected and in use.

IV. DETAILED DESCRIPTION OF THE PREFERRED EMBODIMENTS

As can be easily understood, the basic concepts of the present invention may be embodied in a variety of ways. It involves both methods and systems to accomplish the appropriate methods. In this patent, the methods are disclosed as part of the results shown to be achieved by the various devices described and in steps that are inherent to utilization. They are simply the natural result of utilizing the devices as intended and described. In addition, while some devices are disclosed, it would be understood that these not only accomplish certain methods, but also can be varied in many ways. Importantly, as to the foregoing, all these facets should be understood to be encompassed by this disclosure.

As mentioned earlier, the present invention includes a variety of components that may be used in different combinations, depending on the application that needs to be addressed. The invention is designed primarily to provide a Portable Emergency Response Communications System. In some cases, this may be a mobile unit, for instance, seen in FIG. 1, and in other cases, it may be a more portable unit designed to be carried that may include a plurality of radio connection ports and power outlets, such as shown in FIG. 8. These aspects are described in more detail as the figures are described. This invention is intended to encompass a wide variety of uses, particularly with portable emergency response communications systems, although it could be used in other areas as well.

Figure 1A:
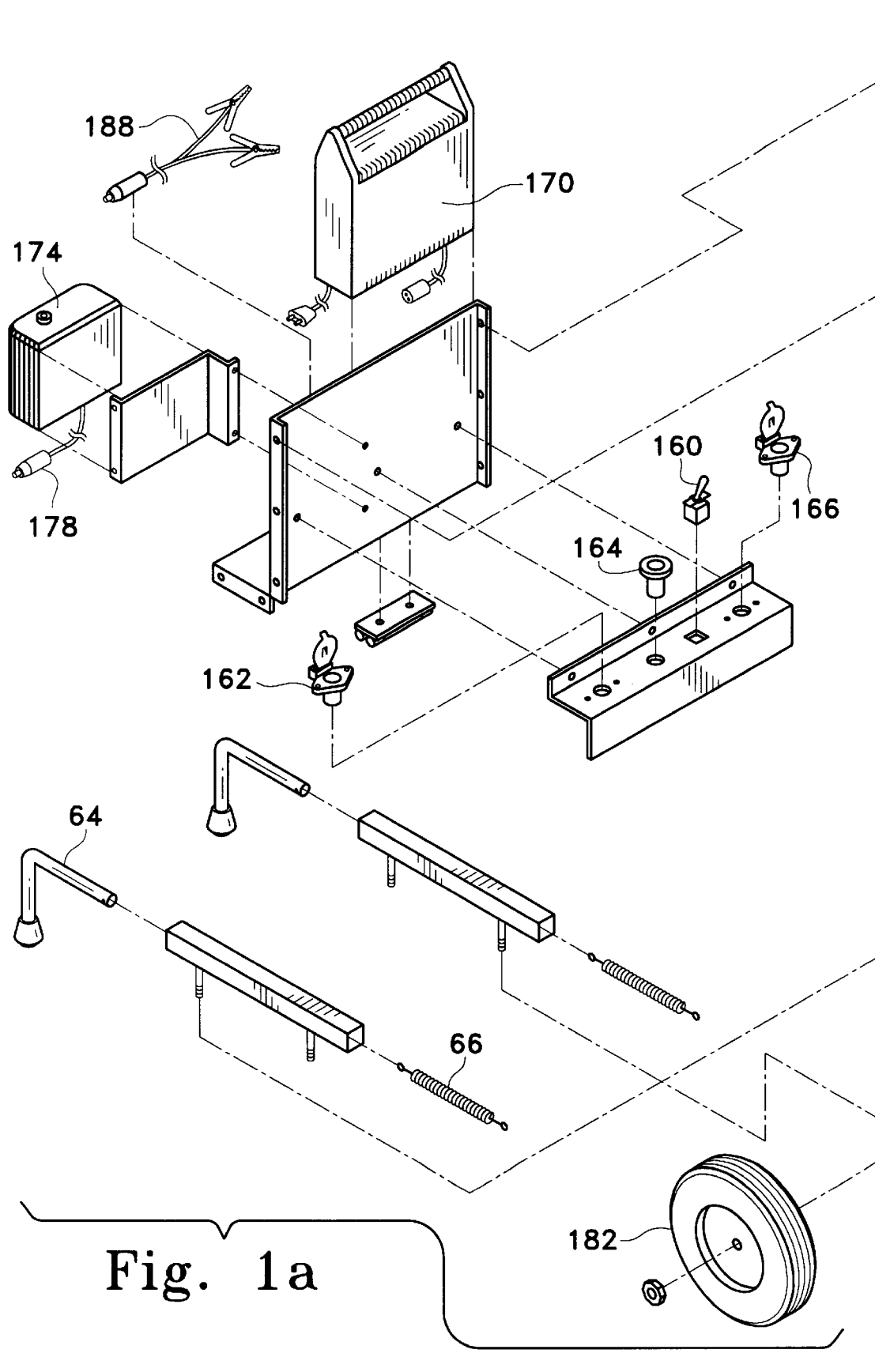
FIG. 1 is a perspective exploded view of one preferred embodiment of the present invention showing the mobile unit.
Figure 1B:
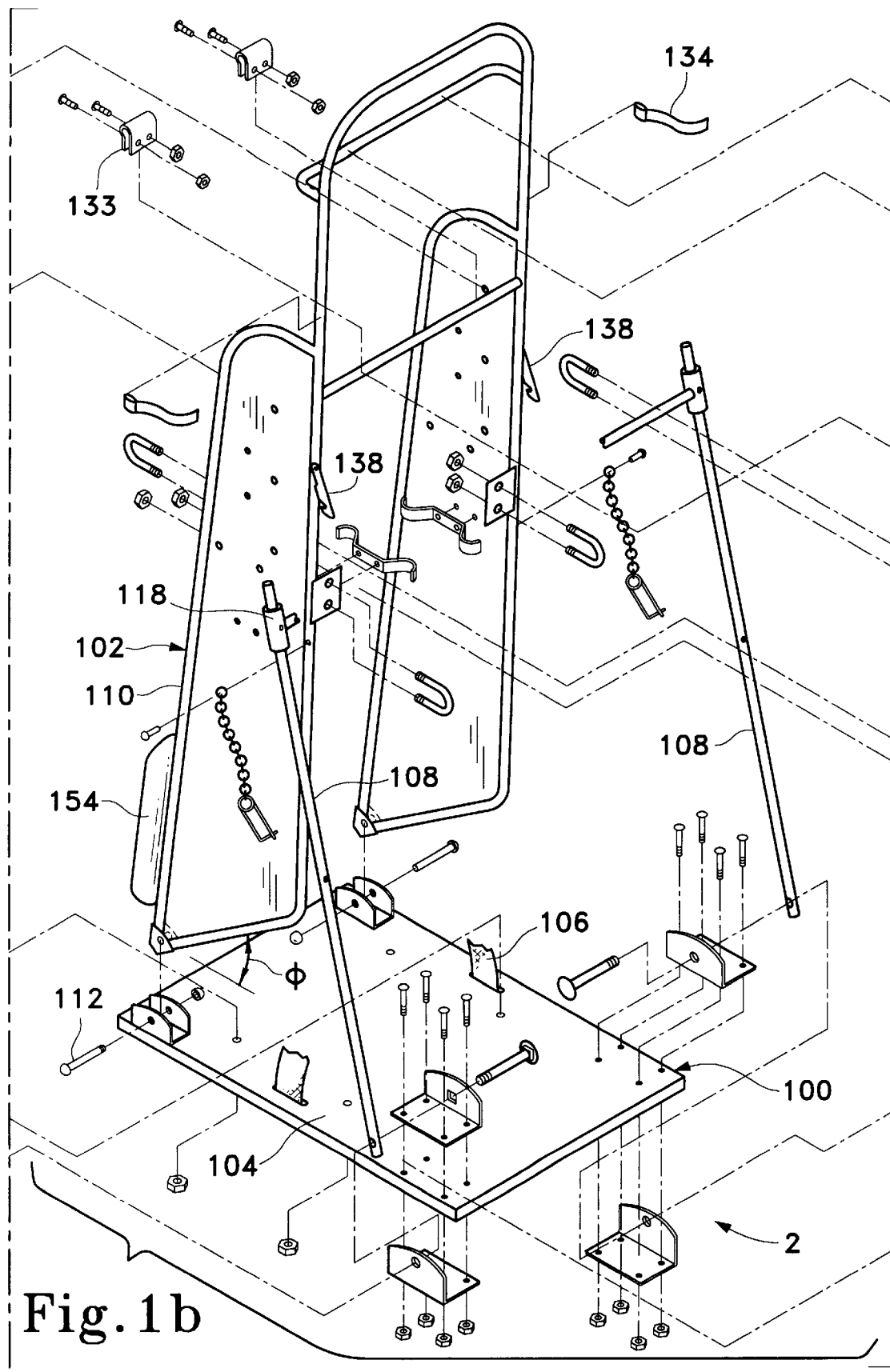
Figure 1C:
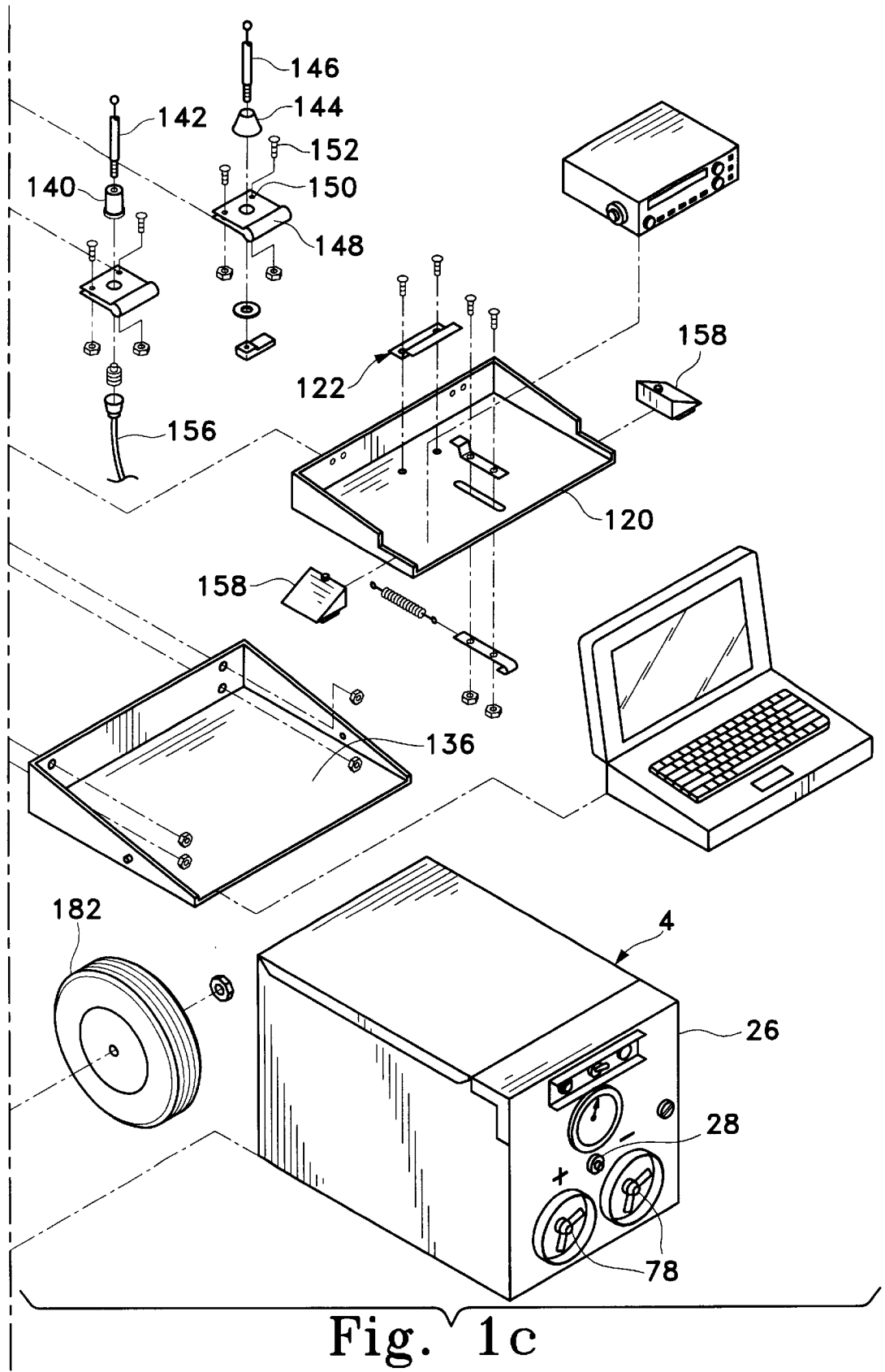

FIG. 1 shows the preferred embodiment of the present invention that includes generally a cart (100) which may include a power system (4) connected to a frame (102) with a mobile element with a variety of connections, shelves, antenna mounts, holders, and so forth to be described in more detail below.

The power system (4) may include a battery condition indicator (6), typically mounted in a face of a power system case (26) or otherwise within a visual or audible awareness range of the case. The battery condition indicator may be an analog volt meter as would be appropriate to indicate the voltage of the 12 volt DC power supply source. The case may be a rugged, impact resistant case able to withstand a substantial impact load. The substantial impact load may be to protect the DC battery contained in the case and may withstand a 50 pound impact over a three inch square area.

The case may be made, for instance, of 24 gauge steel. The power system may be activated by a master power switch (8) which also may be located in a convenient place on the power system case (26). Enclosed in the case may be a portable DC battery containing DC power. In some embodiments, this portable battery may be sized for mega-DC power. By the term "mega-DC power", it is meant to include DC power supply sources in excess of 450 amp hours. As mentioned earlier, a power source of this size may dwarf other previous attempts at meeting the overall needs of portable emergency response communications systems. In the preferred embodiment, a DC power supply source could be a sealed gel cell battery. Such a battery, for instance, is available at a National Auto Parts Association store (NAPA). The battery is advertised to be a "true maintenance free construction, never needing water". Additionally, because it is a gelled electrolyte, it may be operated in any position. As opposed to nickel cadmium batteries, there may be a near 100% power recovery during a re-charge. Furthermore, this unit may operate in sub-zero conditions for extended periods, and may be stored in a discharged condition for extended periods thus typically eliminating winter storage concerns. It can even operate in up to 30 feet of water if accidentally submerged. Importantly, for the present invention there appears to be little or no off-gassing of corrosive fumes or water loss through use. A typical lead acid battery used, for instance, in automotive applications, may generate gases. These gases appear to be highly corrosive to the sensitive electrical and electronic components of a typical radio or computer unit, as well as explosive. It is well known among radio operators that an extended use of an automotive battery can severely corrode their radio, causing replacement or repair. Alligator clips typically used in installations may cause explosions from sparks near the typical lead acid sulfuric battery. It is interesting that few radio operators appear to have considered using a gel cell battery. Furthermore, the gel cell batteries sold by NAPA may allow for deep cycle applications in which the battery charge may be lowered to a very low level and then may be substantially fully recharged without damage to the battery in contrast to typical automotive type lead acid batteries. Furthermore, this battery may be Coast Guard approved and will allow use of the portable emergency response communications system in a variety of hostile environments. The lead acid battery could be used; however, there could be some adverse effects from such usage. For instance, a lead acid battery could be used in place of the gel cell battery, perhaps temporarily, while the gel cell battery was replaced or remotely recharged. While the preferred embodiment includes a 12 volt DC power source, naturally, the invention is not restricted to 12 volts or to DC. Other voltages and power sources are presently available and others may become available in the future; thus any such discussion of 12 volt DC is intended to be representative and may include other power sources that satisfy the general objectives of the present invention regarding a portable response communications system.

The use of this mega-DC power battery and advantages associated with it are illustrated in FIG. 20. FIG. 20 shows that a test was made with a 600 amp hour rated gel cell battery. The test on a typical combination of equipment used for emergency response communications operation concurrently or simultaneously lasted from 4:00 a.m. on a Wednesday to the following Sunday at 8:30 p.m., over five and one-half days, a total of about 112 hours. The equipment included: a 2 meter mobile radio with a power draw of approximately 50 watts when keyed to transmit, a laptop computer, a printer with output from the laptop computer, a cell phone, and a fax machine. The two meter mobile radio was operated approximately 85 hours with a 0.8 amp draw and an additional 21 hours with approximately 2.5 amp draw. A cell phone was operated for approximately 85 hours during this time period. The fax operated approximately 82 hours with approximately 147 pages sent and 241 pages received. The printer was operated approximately 80 hours during this five-day period. The laptop computer was operated approximately 55 hours. Even after this test period on the same unit without recharging, an HT radio was operated three additional 16 hour days. In day five, at 8:30 p.m., the voltage had finally dropped to a level in which it was not preferred to operate some of the equipment (below 11.7 volts). Thus, FIG. 20 shows actual test results of typical operating conditions under an emergency relief condition in which multiple pieces of equipment that would be typically used in an emergency could have power to last for at least a week under normal to heavy usage without recharging. This aspect may be the reason so many of those in this field are so enthusiastic about this invention.

Thus, in an emergency, if the 110 volt AC systems were down such as in the above example in Alaska, this unit would have substantially been able to power an entire emergency relief control center complete with a long range 2 meter mobile 50 watt radio, printer, cell phone, laptop computer, and fax. This unit may be easily transported and offer a multiple of readily configured systems that may be set up in less than typically 60 seconds.

Referring again to FIG. 1, the power system (4) may also include circuitry adapted to deliver the DC power to the various outlets as will be described below. Additionally, the power system (4) may include a primary overload protector (28) that may be mounted in a convenient location such as on the front face of the power system (4). As will be described below, the portable emergency response system may be embodied in a variety of ways. The power system shown in FIG. 1 may be the larger of the various embodiments. Because it may be primarily used in this embodiment, that power system shown may include principally power outlets such as lugs (78) that may be connected up to wires and fastened with, for instance, threaded wing nuts, where the circuitry would deliver power to the rest of the system having the radio connection ports, power outlets, and so forth.

Part of this preferred embodiment of the portable emergency response communications system includes the frame (102). Where appropriate, portions of the frame may be made of rugged seamless metal tubing. It may be steel or may be some non-corrosive material such as aluminum. The frame may have several sub-elements. Starting at the lower end, the power system support (104) may support the power system (4). It may be a platform and may be made of any suitable material such as fiberglass, heavy duty plastic, steel, aluminum, or wood. In some embodiments, the frame may be extended. For instance, this may be applicable if the unit were arranged in a sled environment for arctic or mountainous frigid conditions. The power system (4) may be held to the support (104) by a holding element (106) that could hold the power system to the frame, such as with bolts, or strapping, and so forth. The first upright element (108) may be rotatably connected to the power system's support. By the term "connected", it is not meant to refer only to directly connected but may be indirectly connected in that there may be intervening elements by which the first upright member could be connected which in turn might be connected to the power system support. Thus the term "connected" as used throughout this application may mean indirect or directly connected. A second upright member (110) may be also rotatably connected to the power system support. Each of these members may be connected to the power system support through a rotatable frame element (112), such as a hinge, a pin arrangement, or other rotatable connection as would be known to those in the art. As shown, the second upright member may be angled at the bottom to allow a rotation downward at an angle φ. The system also includes at least one frame securing element (118). This frame securing element as shown may be connected to, for instance, the second upright member. It may be adapted to secure the first upright member with the second upright member. The first upright member (108) may be secured with the second upright member using the frame securing element (118) in a first raised position. Typically, this frame could be in this position while the unit is in use. The upright members may also be secured in a lowered second position, shown in FIG. 5, such as when the unit is ready for transportation. The frame securing element (118) may include the embodiment shown in FIG. 1, such as a locking slip ring that may slidably engage the other upright member. The locking slip ring also can include a retractable or removable pin that may assist in locking the slip ring in a variety of positions such as the raised first position and the lowered second position. In the embodiment shown, the locking slip ring could be attached to the second upright member and could slidably engage the first upright member. For convenience in securing the upright members, the first upright member might have at least two openings (such as holes) at the different positions which may align with the locking slip ring.

Continuing upward, the portable emergency response communications system may include at least one radio support shelf adapted to support at least one radio and mounted to the frame. The shelving maybe made, for instance, of 20 gauge material. A radio support shelf may also be seen in FIGS. 2 and 3. The radio support shelf could include a variable radio base restrainer (122) as shown and described in more detail in FIGS. 6 and 6a below. The radio support shelf may be hingeably connected to one of the upright members with a shelf hinge (133) shown in FIG. 3. It may be held in place by a shelf restraining element (134) as shown in FIG. 1. The radio maybe secured to the radio shelf so that when a unit is transported, the shelf may be relocated (such as by rotation) into a transporting position and secured with the shelf restraining element (134). The shelf restraining element may include latches, pins, and even Velcro® straps. For the preferred embodiment, the Velcro® straps may be used.

Figure 2:
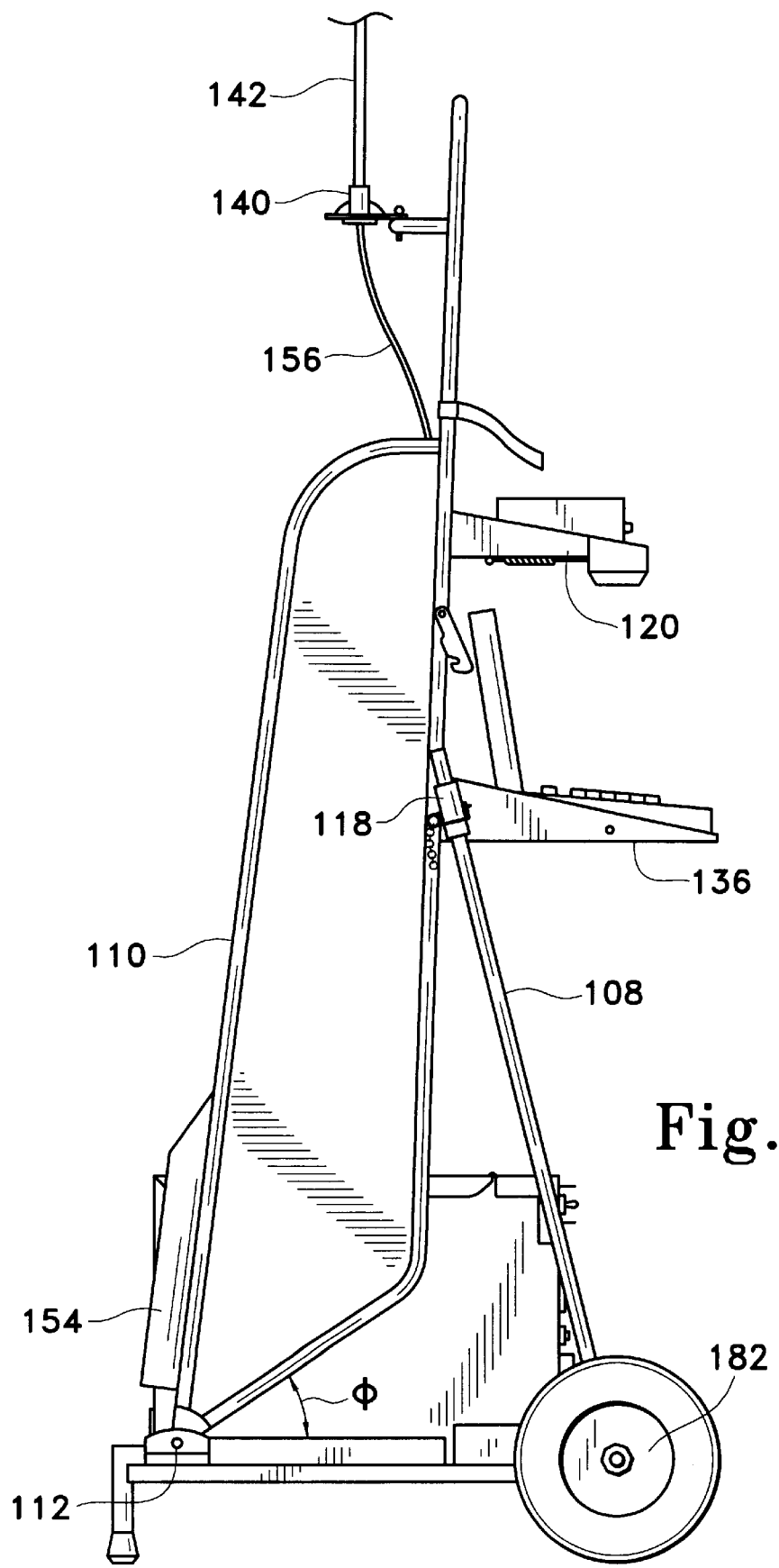
FIG. 2 shows a view of the mobile unit in a set up condition with the HF antenna fully extended and the shelves lowered having a computer and radio ready for operation, which may take a minute or less to set up.

A second shelf (136) may also be used for other radios or computers. In the preferred embodiment, as shown in FIGS. 1 and 2, a laptop computer may fit onto the shelf. The laptop computer may be secured to the shelf which may be rotated or otherwise relocated into a transporting position similar to the radio support shelf (120). However, in many instances, the user may prefer to carry the computer separately. In the preferred embodiment, the second shelf (136) may be designed such that an operator may be able to place and open a laptop computer with sufficient room to not interfere with the operation of the radio on the radio support shelf (120). (Obviously, the radio support shelf could be used for other purposes as well.) The second shelf (136) may also be hingeably connected to the frame to be positioned to a transport-storage position and may also have a shelf restraining element (138) which could include latches, pins, and Velcro® straps.

Continuing upward from the shelves, the portable emergency response communications system may also include at least one antenna mount. In the preferred embodiment, two antenna mounts are shown. The first antenna mount (140) may be configured for an HF radio antenna. A second antenna mount (144) may be configured for a 2 meter mobile radio. For some embodiments, the system may come supplied with an HF antenna (142) to fit into the first antenna mount (140) and a 2 meter antenna (146) which may fit into the second antenna mount (144). Thus the system may have the capability to maintain communications through at least two radios such an HF and a 2 meter mobile radio. (The system may also have a capability through a third and fourth means described below.) With the ability to operate at least two simultaneous radios, multiple radio communications can be maintained with multiple sources. This may assist in relaying important information to emergency conditions. The antenna mount may include a mount sleeve (148). The mount sleeve may relocate (such as by rotation) into a transport-storage and an operating position. To assist in securing the antennas in the transport-storage position, a sleeve retainer (152) (such as a pin) may be inserted through an opening (150), for instance, in the frame at an operating position or at a transport-storage position. The system may include the associated wiring (156) from the antenna to the antenna connection in the various radios that may be used. Because the antenna mounts may be rotated to a storage position which may be upside down from its normal use, a sealer around the antenna mount, such as silicon, may be appropriate to seal from inclement weather conditions.

When the unit is being transported, the antennas may be inconveniently long. Thus, the antennas may be disassembled and stored in an antenna storage element (154). In the preferred embodiment, this may be a sleeve sized for an appropriate diameter of the antenna This may be further seen in FIG. 5 described below.

Figure 3:
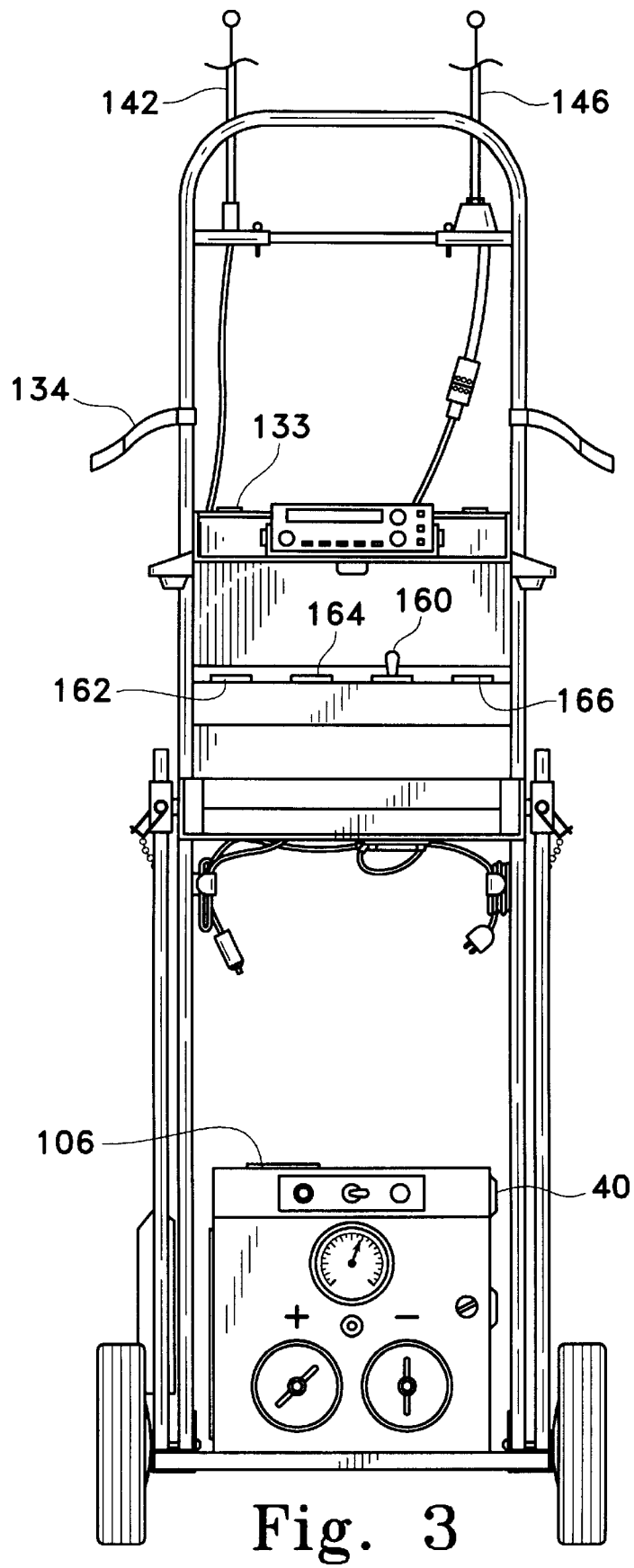
FIG. 3 shows a front view of the portable emergency response communications system to detail various aspects of the invention.

An added feature to the portable emergency response communications system may be one or more lights (158). The lights may be adapted to illuminate a portion of the frame. This portion may include, for instance, the radio shelf area where the radios, computer, and so forth may be situated. It may also include a light switch (160) to easily activate the light. The light (158) may be in a substantially fixed position or may be attached on a flexible stem for orientations at different positions and angles. In one embodiment, the flexible stem and light may be folded into a frame area and covered by the second shelf (136) in a transport-storage position. A radio connection port (162) is shown in FIG. 1, and in more detail in FIG. 3. The radio connection ports may include a latching multi-pronged port, a weather shield cover, and an orientation element. Typically, the radio connection port will have the female attached to the emergency response communications system and the male portion connected to the particular power requirement unit such as the radio, computer, and so forth. An additional radio connection port may be a 12 volt DC cigarette lighter type outlet (164). The cigarette lighter type outlet (164) may be mounted as shown in FIG. 3 between the other types of radio connection ports (such as the latching multi-pronged ports). There may be one or a plurality of cigarette lighter type outlets. The cigarette lighter type outlet (164) may be used for such radios as a hand held HT radio which generally has a power requirement of approximately 5 watts. Similarly, the same outlet could be used, for instance, as a computer power source outlet, a light outlet, and other power using units similarly configured. This type of outlet may also be used as an inlet such as for recharging of the power system (4), as will be described below.

Thus, in the embodiment shown in FIG. 3, there could be at least a first and second latching multi-pronged radio connection port and at least one 12 volt DC cigarette lighter type outlet. Thus, three types of radios, the HF, the HT, and the 2 meter mobile, could be used simultaneously as the needs occur. With an additional cigarette lighter type outlet, the computer could be used simultaneously with another cigarette lighter type outlet (or naturally the computer used in place of the HT radio in that port). Also, the inverter described below could be used to power such items as a fax machine and printer, all simultaneously or concurrently. Obviously, various combinations could occur as the need arises.

Figure 4:
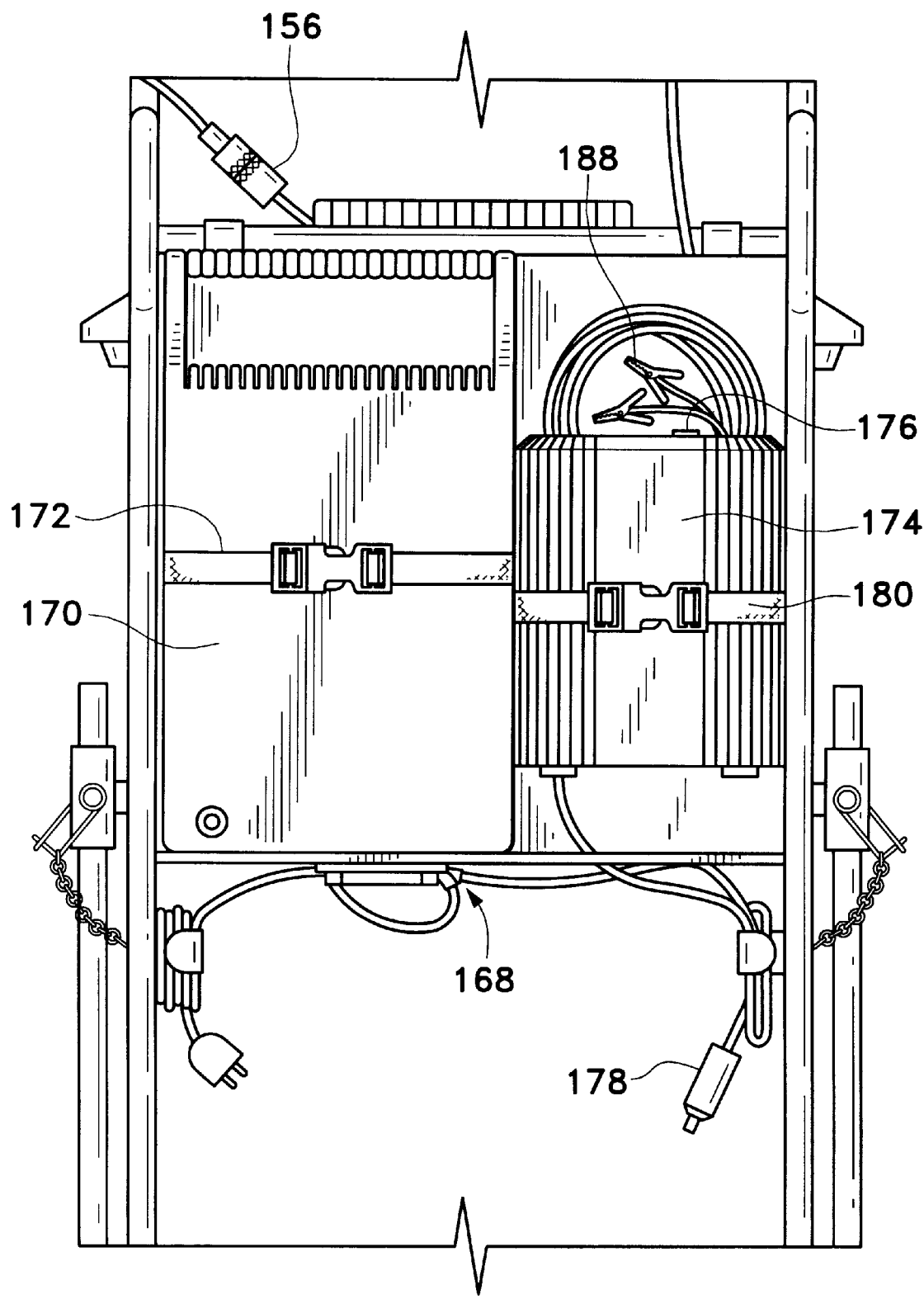
FIG. 4 shows a back view of the portable emergency response communications system showing specific details of that area.

Referring to FIG. 4, in the rear view, at least two additional aspects are shown. In the preferred embodiment of the portable emergency response communications system, a battery charger responsive to the frame is shown. For instance, it can be connected to the frame with a charger holder (172). The charger holder could be a strap as shown, or screws, bolts, adhesive, and so forth as would be known to those with skill in the art. The battery charger would naturally include the associated input and output wiring. For instance, the charger could include a 110 volt AC inlet that could be plugged into a typical wall plug and a 12 volt DC, 10 amp outlet that could be plugged into a choice of at least two connections on the emergency response communications system. One plug could be the 12 volt cigarette lighter (164) described above to, in essence, back charge the power system (4). A second place to charge the power system (4) could be connected directly to the power system (4). This is shown as the power connecter port (40) (which in this case could serve with a dual function of a recharging inlet). The power connecter port would be a 12 volt DC cigarette lighter type outlet similar to the outlet (164) or it could be an outlet similar to the latching multi-pronged port described below.

In the embodiment shown in FIG. 4, to the side of the battery charger (170), may be mounted an inverter (174). In the preferred embodiment, this may be a 12 volt DC to 110 volt AC, 300 watt inverter. This could be used, for instance, to operate the fax machine and printer. The inverter inlet could be a 12 volt DC cigarette lighter type male plug (178) that could be plugged into the cigarette lighter type outlets (164) and (165) described above. The outlet (176) of the inverter could be a typical 110 volt receptacle female plug. In the preferred embodiment, the inverter might have two 110 volt outlets. The inverter could be held to the frame by an inverter holder (180) as shown, such as a strap, bolts, adhesives, and so forth.

The system is very versatile as can be seen above and will be described in further detail below. One aspect that may be mentioned at this point is one method of recharging the system. For instance, if an independent 12 volt source were available such as a nearby automobile, jumper cables (188) could be hooked directly to the automobile battery and placed on the lugs (78) shown in FIG. 1 to recharge the system. However, one present nuance of the gel cell battery is that it may not be charged at the rate typically associated with automobile recharging systems without possible damage. At present, while offering many other advantages, the materials used in the gel cell battery may require a slow charging rate, typically a maximum of 10 amps. Thus, an automobile recharging system of 40 amps and above might damage the gel cell type battery. In some embodiments, a selective charge controller may be incorporated into the power system (4) that could allow charging from such a source. In other embodiments, it may not be included. Thus, a method that might work with or without the selective charge controller is described. With the above described embodiment, the 12 volt cigarette type outlet male plug (178) from the inverter (174) may be used to plug into a typical automobile cigarette lighter outlet (also typical on some bulldozers, snowmobiles, and other battery systems). Thus, a 110 volt source could be produced through the inverter (174). Then, the battery charger (170) inlet, having a 110 volt male plug, could be inserted into the female 110 volt outlet of the inverter (176). The outlet from the battery charger (170), which is designed to be limited to approximately the 10 amp present charging capacity of gel cell batteries, could be plugged into the 12 volt cigarette lighter outlet (165) such that the charging circuit was not over stressed. Naturally, other methods could be used.

The portable emergency power response communications system shown in FIGS. 1 and 2 could include a mobile element (182). These may be connected to the frame and adapted to enable movement of the frame with the power system (4). The mobile element (182) could be wheels, such as solid or pneumatic wheels. The mobile element (182) might also include tracks or sled runners (184) as might be more appropriate in some arctic or other ice or snow laden environs.

In summary, the above portable emergency response communications system is designed to combine to form an impact resistant, flexible, multi-functional, portable, and quickly usable emergency response communications system. While individually some of the components may be found in a variety of local auto parts stores and hardware stores, the system has generated a large amount of interest because of its unique and previously unknown capabilities in meeting the desires of those individuals and groups described above.

Other aspects not shown in FIGS. 1 and 2 and related figures may be added as the market and needs develop. A solar recharging system could be useful in some instances. If the system were located in a remote area for an extended period of time and access to recharging equipment was unavailable, then a solar recharger system might assist in maintaining the charge for an indefinite period of time. This could be useful also if the system were connected to a repeater system. As is known to those in the communications systems field, a repeater system is useful for amplifying and relaying weaker signals to cover more distance. Typically repeater systems, because of the heavy wattage draw, may be connected to a 110 volt AC system. However, given the uniqueness of the present portable emergency response communications system, the power from the system may be sufficient to use in a repeater system application and could be supplemented by a solar charging system for remote or extended periods of time. This power system of the emergency response communications system opens new possibilities and avenues that heretofore have gone without solution.

Another option may include brakes on the unit. This could be especially useful in slippery conditions and may be particularly useful in applications where the communications system is mounted on a sled as it is transported over inclined surfaces.

Still another aspect of the embodiment shown in FIGS. 1 and 2 may include some stabilizers located near the lower surface of the frame to contact a supporting surface such as a floor or ground. The stabilizer (64) may be biased inward toward the frame, for instance, by the use of a stabilizer spring (66). The stabilizers may be pulled out and secured in position by the use of notches and pins as would be known to those skilled in the art However, in many instances, the use of such stabilizers may not be necessary.

Still another option might be a retractable antenna that might be retracted into a case when not in use. This type of antenna is described in more detail in FIGS. 18 and 19, but suffice it to say at this point, that it could be used in substitution of or in addition to, the folding antenna mounts described above.

Still another option might include a cover, shown more specifically in FIG. 7. The cover (190) could be an umbrella, such as a large umbrella, or it could be a specially designed cover to surround the portable emergency response communications system embodiment shown in FIG. 1. This cover (190) might include a repositionable awning (191) that may be supported with supports (192). Thus, a user and the equipment might be shielded while using the communications system in inclement weather.

An additional option may include jumper cables (188), shown in FIG. 4, that may connect to a typical lead acid battery in an automobile, for instance. Naturally, to the extent that other power sources are available in remote locations, they either can supplement the power system (4), or they can recharge the power system (4), or they can lessen the drain on the power system (4) and thus increase the duty cycle for some incremental period.

Figure 5:
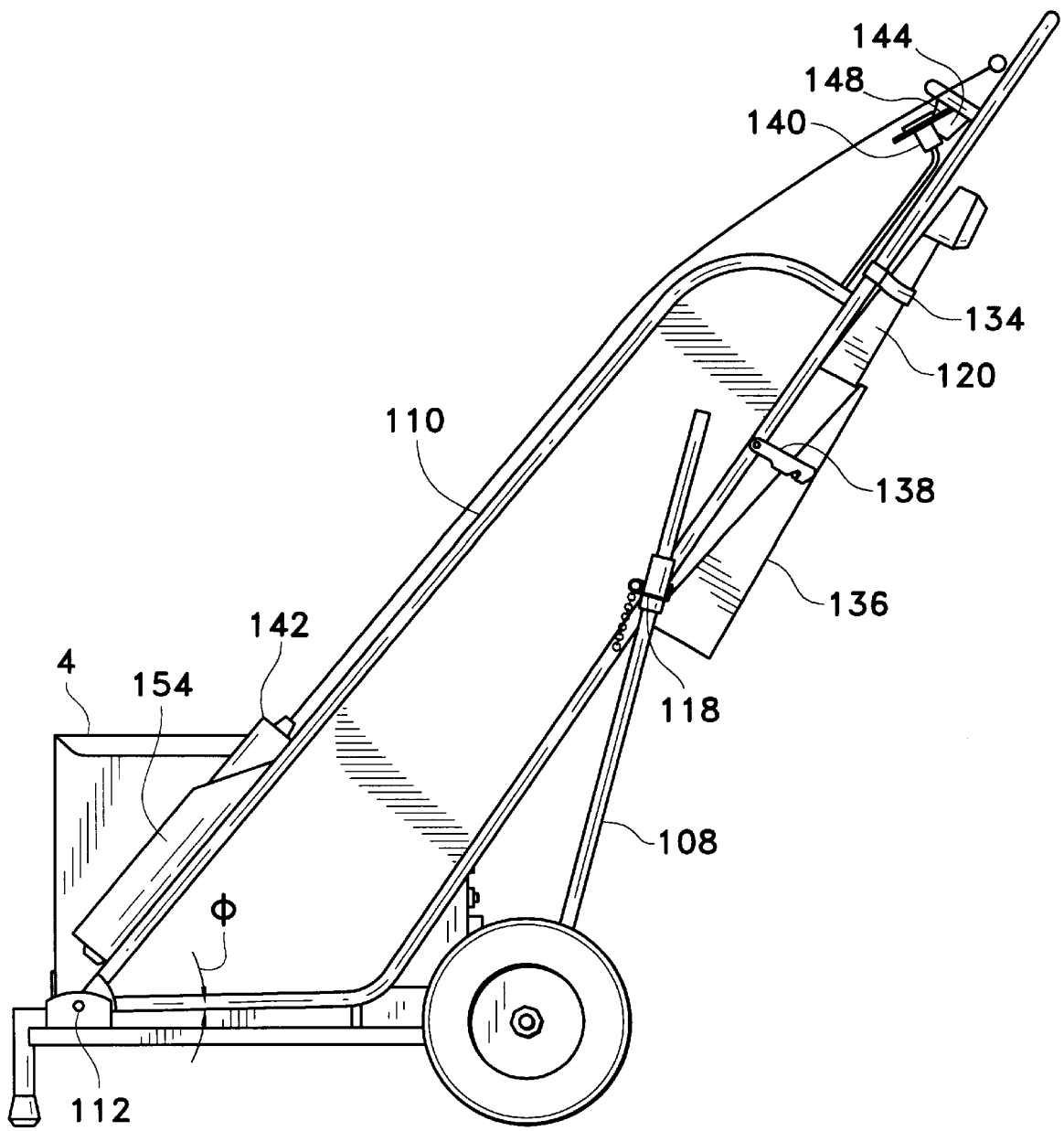
FIG. 5 shows the portable emergency response communications system in a lowered position ready for transport.

FIG. 5 shows the embodiment of FIG. 1 in a collapsed position for transporting to a variety of locations. As can be seen, the first antenna mount (140) and the second antenna mount (144) have been relocated to a storage position such as by turning the mount sleeve (148) downward. The radio support shelf (120) has been rotated upward toward the frame and secured by the shelf restraining element (134). Similarly, the second shelf (136) has been rotated inward toward the frame and secured by its respective shelf restraining element (138). In this embodiment, as seen at FIG. 5, the first upright member is tilted away from the power system (4). Likewise, the second upright member (110) is tilted toward the first upright member and away from the power system (4). The frame securing element (118) has moved to a lowered second position on the first upright member (108) in comparison to the raised first position shown in FIGS. 1 and 2. Likewise the angle φ has been decreased in FIG. 5 compared to that angle in FIG. 2. The second upright member (110) has rotated about the hinge (112) to the lowered position. Also, shown in FIG. 5 is the antenna storage element (154) holding a portion of the larger HF antenna (142).

Naturally, other embodiments are possible of the emergency portable response communications system. For instance, in some embodiments, it may not be significant to rotate the first and second upright members to a lowered position. In such instances, a fixed relationship could be had. It appears that in many instances, a hingeably connected antenna mount may be preferable and in many cases a hingeably connected radio support shelf may be preferable. However, variations are certainly possible. Some embodiments may be designed to collapse and others may be more fixed.

Returning to a specific detail of the embodiment, such as shown in FIG. 1, the variable radio base restrainer is shown in FIGS. 6 and 6a. FIG. 6 shows a top perspective view of the variable radio base restrainer. The radio shelf (120) may utilize such a restrainer, although other shelves could likewise use such an element. The embodiment shown in FIG. 6 includes a first restrainer (124). The first restrainer may be relatively fixed in position on the radio support shelf (120).

A second variable restrainer (126) may move forward and backward with respect to the first restrainer (124). To assist in alignment of the second variable restrainer (126), a guide (130) may be useful. The guide (130) may include a slot, a rail, or other guiding means. The second variable restrainer (126) may be biased toward the first restrainer (124) by use of a spring, elastic element, and so forth. In other instances, it may be simply sufficient to include securing elements such as a bolt, pin, and so forth. FIG. 6a shows a side view of the perspective view of FIG. 6. In this view, the first restrainer (124) may be shaped to receive a base of a radio shown in dotted lines. The second variable restrainer (126) may be positioned closer or farther from the first restrainer (124). The biasing element (128) may bias the second variable restrainer toward the first restrainer (124). A tab (129) may be useful to assist positioning the second variable restrainer (126).

In use, a radio base may be secured to the radio support shelf (120) by simply pulling the tab (129) to an extended outward position, inserting the base, underneath the first restrainer (124) on one portion of the base and then allowing the second variable restrainer (126) to restrain a second portion of the radio base. Thus, the radio can be easily removed and relocated, yet held securely by such an arrangement.

Having described the different aspects of one embodiment of the portable emergency response communications system, a method of using the system might include using a frame supporting a DC power system and radio at a location, moving a radio support shelf connected to the frame from a serviceable position to a storage position, loosening a securing element from raised position on the frame, arcuately moving the first upright member in an arc to a lowered second position on the frame in cooperation with a second upright member, securing the first upright member at a lowered second position, holding the frame in the lowered second position, moving the frame with the mobile element connected to the frame, relocating the frame to a new location, loosening the securing element from the lowered second position, arcuately raising through an arc the first upright member to the raised first position, securing the first upright member in the raised first position, relocating the radio support shelf to form said storage position, and commencing using the DC power system and the radio. The method might also include folding at least one antenna mount into a folded or retracted position.

FIG. 8 shows a variety of embodiments of an alternative portable emergency response communications systems. In these systems, the mobility may still be had by carrying the system. In these embodiments, for instance, the various radio connection ports and power outlets may be incorporated into the case itself, thus retaining the wide versatility of the above described portable emergency response communications system. In the system (2a), there appears in FIG. 8 at least two specialized radio connection ports including the latching multi-pronged ports, and another radio connection power outlet port between the two latching multi-pronged port connecters and slightly above it (obviously, other placements can occur). On the side toward the front may be yet a third specialized multi-pronged radio connection port that may be used as a recharging port as described in the above embodiment of the portable emergency response communications system, such as could be used with a battery charger. The portable emergency response communications system (2b) in the center of FIG. 8 is similar to the system (2a). A difference of this system is that it may include a selective switch to control a selective charge controller to allow charging from a variety of sources as will be described in more detail below. Finally, for comparison, the power system (4) is shown in FIG. 8 as somewhat of a contrast to the other units. While the power system (4) could independently operate various power needs (such as radios) in the preferred embodiment, it is primarily intended to be a power system (4) for the portable emergency response communications system (2) described above with the cart (100). Thus, it may (but is not mandated) have less radio connection ports and power outlets than the portable emergency response communications systems (2a) and (2c) and may be larger. This size may be more appropriate for the system shown in FIG. 1.

FIG. 9 shows more detail of the portable emergency response communications system (2a). Beginning at the lower left front panel, most of the instrumentation and outlets may be located on the front panel including the radio connection ports (30). This front panel may be easily opened with a front panel access latch (60). These radio connection ports may be adapted to allow ready connection to the radios. For instance, they may be hand disconnectable, and are typically a female connection located on the case to connect with a male connection on the radio or power using device. In some cases, the radio connection ports (30) may be the latching multi-pronged port. A multi-pronged port may have multiple purposes. For instance, while its primary intention may be to supply power to the radio, it can be used as a power inlet for recharging purposes. In some cases, the radio connection ports may include a weather shield cover. The weather shield cover may be waterproof but in many instances it may primarily be a dust restrictor. In some embodiments, the radio connection port may include a locking indent which may also serve to latch or at least restrain the male connector to the female connector typically. This is shown in more detail in FIG. 16. The radio connection port may also include an orientation element so that the positive and negative circuitry is consistently connected in a uniform manner under adverse conditions such as darkness. In other instances, the radio connection ports may include a cigarette lighter type port. This may also be useful for supplying power to, for instance, a hand held HT radio which typically is supplied with such a connection, providing power to a laptop computer or spotlight, or other lights, and may even be used for recharging purposes.

More specifically, an HF radio port (32) may be included with the emergency response communications system. As described above, the HF radio typically may come with simply bare wire leads. A typical practice of ham radio operators, using an HF type radio, is to wire it directly into the power system, often as a fixed base station radio. Thus, even if the power system and radio generator may be transported by hand, the radio is not readily disconnectable. This is partially because an HF radio requires such a large power requirement—up to 1500 watts. Typical available connectors may wear with time and may not provide suitable long term connectability. In contrast, the present invention in one aspect may use a rugged latching multi-pronged port such that, the HF radio may be connectable and disconnectable even by hand through the power system for many years. For instance, if the radio were to become inoperable through disrepair or breakage, another radio could readily be inserted with minimal delay in the emergency communications circumstances.

Similarly, a 2 meter mobile radio port (38) may be included. Although, the 2 meter mobile radio has less power requirements, the port may be a similar to the HF radio port (32). Thus, the radios could be interchanged from one port to the other, or two 2 meter mobile radios could be used simultaneously, instead of one HF radio and one 2 meter radio, or other combinations and arrangements. In the embodiment shown in FIG. 9, slightly upward from the HF radio port and 2 meter mobile radio port may be an HT radio port (36). Typically, these radios have limited ranges and smaller power requirements. They may be supplied with a 12 volt cigarette lighter type male plug connecting with the corresponding inlet. Thus, in the preferred embodiment, the HT radio port (36) may be a female 12 volt DC cigarette lighter type outlet. On the side of the emergency response communications system may be yet another port herein called a power connecter port (40). In some instances, this power connecter port (40) may include a similar design as a radio connection port (30) having a latching multi-pronged port. In other instances, it may be preferable to have another port in the style of a 12 volt cigarette lighter type port. Thus, in the embodiment shown in FIG. 9, four radios could be used simultaneously, possibly for different frequencies, different destinations, and different distances. The power connector port (40) may also have multiple purposes. For instance, one other purpose could be to allow a power source to recharge the portable emergency response communications system through the power connecter port (40). While the other ports may allow such recharging, as will be shown in FIG. 13, this port may be designed to allow direct recharging to the battery.

In proximity to the HT radio port (36) may be yet another power outlet for a computer and could be designated a computer power source outlet (42). This may be adapted for a portable computer. In some instances, it may be preferable to use a 12 volt DC cigarette lighter type port for this power source outlet as well. Naturally, in some embodiments, the computer power source outlet (42) could be the same as the HT radio port (36). In those embodiments, the use of the HT radio might be temporarily substituted for the use of a portable computer, as the circumstances require. Obviously, a variety of ports are available as may be needed. Somewhat importantly to the present invention is the ability in a compact package to operate a multiple of power using units such as might be required at an emergency communications control center.

The embodiment shown in FIG. 9 might also include at least one antenna mount (45). The antenna mount could be disconnectable or could be more permanently secured to the case of the communications systems. The antenna mount (45) could be mounted to the side. Such an antenna described above for the HF or 2 meter mobile radios could be removably disconnected and reinserted with some rapidity. In some instances, the antenna might even be secured to the communications system and not disconnected and reconnected each time it were used.

Also shown in FIG. 9 may be a light (76). This light could be mounted to the case in such a fashion that it illuminates a fairly fixed area, or alternatively, could be mounted on some flexible arm for repositioning. A power source for the light could be internal to the communications system or the light could simply be plugged into one of the ports such as the computer power source outlet, the HT radio port outlet, or the other radio ports, or other power sources. Also shown in FIG. 9 may be a first overload protector (44) adapted to protect at least one of the radio connection ports. In the preferred embodiment, this may be a circuit breaker of about 30 amps which typically might include a push button reset. Likewise, a second overload protector (46) may be adapted to protect a second of the radio connection ports, which also could be a circuit breaker with a reset button Alternatively, it could include such an overload protector as a replaceable fuse. For many instances, a 20 amp fuse may be appropriate in protecting a 12 volt cigarette lighter type port (36).

Other features of the embodiment shown in FIG. 9 may include a master power switch (8) which may activate the unit. It may include a power indicator (50) (such as a light, meter, LEDs, audible signal, and so forth) that for instance may indicate when the master power switch (8) is turned to an "on" position. It may also include a battery condition indicator (6) which may be an analog volt meter. The battery condition indicator (6) may be illuminated by a light (5), shown in FIG. 13, such that the user could check the battery condition under dark or otherwise adverse circumstances. The light may be activated by a switch (7), such as a momentary touch switch. The momentary touch switch might be appropriate to conserve energy. Alternatively, the switch might not be present if, for instance, the user wanted to continually monitor the battery condition indicator and so the light might stay on whenever the master power switch (8) was in an "on" position. The handle (62) might assist in carrying or transporting the communications system to remote locations. Obviously, the handle could be a variety of configurations such as shoulder straps, back pack straps, and so forth.

FIG. 10 shows a similar embodiment as FIG. 9 with at least one exception. This embodiment includes a multiple position switch (82), which may be a three-way switch. The three-way switch may activate an integral selective charge controller (80) described in more detail in FIG. 14.

FIG. 11 shows the embodiment of the power system (4) that was described above with the portable emergency response communications system (2) in FIG. 1. In this embodiment, a minimal amount of radio outlet ports maybe included. The primary power source supply may be through the power lugs (78). This embodiment also shows a power connector port (40), described in FIG. 9. Again, this port may be useful for supplying power for radios, and may be used to recharge the battery of the power system. The battery contained in this unit may be much larger than the battery contained in the embodiments of FIGS. 9 and 10 to provide the mega-DC power. For instance, the batteries contained in FIGS. 9 and 10 may be on the order of a 25 amp hour battery. The battery contained in FIG. 11 may be on the order of a 600 amp hour battery.

FIG. 12 shows at least two aspects of the power systems and the communications systems. First, it shows the easy access through a top (27). The top (27) may be hingeably mounted to the case (26). It may also have an access latch (61) similar to the front panel access latch (60). Secondly, shown in this embodiment is a selected charge controller (80), described in FIG. 14. As shown, it may be mounted to the top (27) or any other appropriate place relative to the communications system.

FIG. 13 shows a typical simplified wiring diagram of the portable emergency communications systems described herein and particularly the embodiment of FIG. 9. The battery (10) has been described already. The term "battery" has been used in this patent to refer to a general DC power supply source. Obviously, other ones may exist and as improvements in technology occur, other DC power supply sources may be accomplished and would be included under the term "battery" as used herein. It may be a gel cell type battery with the various advantages mentioned. In some instances, it may be a smaller battery (yet larger than those typically used in the art) of approximately 25 amp hours. In other instances, the battery may be at least 450 amp hours and in the preferred embodiment, 600 amp hours. As described above, this may be termed a mega-DC power source. In the preferred embodiment, the mega extended period could be at least 16 to 17 hours per day of normal to heavy usage for at least three days operating at least a 2 meter mobile radio with a rated power draw capacity of 50 watts, a computer, such as a laptop computer, a fax machine, a portable cell phone, and a printer. A minimum practical useful limit could be six hours using all of the above equipment.

The general circuitry (12) is generally envisioned to supply power with various overload protectors to each of the individual radio connection ports, power outlets, and recharging circuits, as well as the various instrumentation. For the extreme conditions to which the present invention may be used, a special type of wiring may be used in the preferred embodiment. This is known as "arctic" wiring. Typically this wiring has a different sheath composed of neoprene that may not crack and break under extreme cold conditions. As would be known to those in the art, it may be rated for 105 degrees Celsius down to as low as negative 55 degree Celsius. Furthermore, it has an increased number of wire elements compared to the normal multi-strand wiring for better conductivity.

From the battery (10) to the master power switch (8), a first power circuit (14) may be wired From the master power switch (8), a second power circuit (16) may be provided to connect to a primary overload protector (28). The primary overload protector may be located after the master power switch and before the first, second, and third overload protectors described below. After the primary overload protector (28), a third power circuit (18) may be connected to deliver power to at least one of the radio connection ports, here shown as the HF radio port (32). Along the circuit at some point may be a first overload protector (44). This may be a circuit breaker as was described in FIG. 9. In parallel to the third power circuit (18) may be a fourth power circuit (20) connected to the second power circuit, typically downstream from the primary overload protector (28). The fourth power circuit (20) may deliver power to a second radio connection port such as the 2 meter mobile radio port (38) described in FIG. 9. A fifth power circuit (22) may also be connected to the second power circuit, typically downstream from the primary overload protector (28), and may deliver power to the computer source outlet (42). Yet another power circuit may deliver power to the HT radio port (36). Another circuit, the power-recharging circuit (25), may be connected in the first power circuit (14) downstream from the battery (10). The power-recharging circuit (25) may be connected a second point to the power connector port (40) described in FIG. 9. This circuit may also have an overload protector, such as a 20 amp fuse. The power-recharging circuit may allow recharging of the battery without the rest of the circuitry energized by being connected between the master power switch (8) and the battery (10). Alternatively, the master power switch can be closed so that power into or out of the power connector port (40) may be used in conjunction with energizing at least a portion of the other circuits. (As a further alternative, the master power switch (8) could be opened to isolate the rest of the circuitry and yet allow power out of the power connector port (40).) A power indicator (50) may be connected at some point in the general circuitry (12). As shown in FIG. 13, a typical place may be downstream from the primary overload protector (28). Thus, if the overload protector were tripped, the power indicator could indicate that the downstream circuitry was not energized. Likewise, the battery condition indicator (6) may be connected downstream from the primary overload protector (28), although other locations certainly are feasible. The battery condition indicator (6) may be illuminated by a light (5). The light (5) may be switched through switch (7), such as a momentary touch switch.

The embodiment of FIG. 14 may be similar to the embodiment of FIG. 13. However, FIG. 14 includes the multiple position switch (82) and the selective charge controller (80). This special charging circuitry may enable recharging through a wider variety of power sources, such as a car or truck or snowmobile, and so forth, which may be important in emergency conditions. (The other aspects are not repeated for simplicity, although they may be similar to those aspects described in FIG. 13.) The multiple position switch (82) may have a first position (84). The first position (84) may have generally direct charging capabilities with respect to the communications system. In other words, it may not need a charge controller and is restricted only by the charging system providing input through the power connector port (40). (Naturally, the switch might be an electronic chip with internal switching capabilities or other switching means.) However, this direct charging does not exclude an overload protector in the circuit. For instance, in the first position (84), a battery charger of approximately 10 amps could be hooked directly to the power connector port (40) with little concern of damage to the system (unless of course the battery charger malfunctioned.) The multiple position switch (82) may have a second position (86). The second position (86) is intended to specifically restrict the charging capabilities to a to a rate commensurate with recharging of the gel cell battery. This might be necessary when charging from an excessively high charging source such as an automotive alternator. Such a power source may have a charging rate of generally 40 to 100 amps, and could damage the gel cell battery. In this second position, the circuitry could include a selective charge controller (80), so that some high charging rate power source could still be connected without damage to the battery (10) or system. If the multiple position switch were accidentally placed in the first position (84) and connected to the high charging rate power source, an overload protector could provide some protection until the error was realized.

To use such a system, a method might include providing a portable emergency response communications system including a DC power source, delivering the DC power to at least one radio connection port, selecting a charging condition through a selective charge controller connected to the portable emergency response communications system, controlling the charging condition of the portable DC power source through the selective charge controller, and allowing charging of the portable DC power source through the selector charge controller. The selective charge controller may be integral to the communications system. Furthermore, using this aspect might include restricting the charging of the DC power source in a switched position of the selective charge controller.

FIG. 15 shows a simplified circuit diagram of the power system (4) shown in FIGS. 1 and 8. Because this unit may be primarily intended to power an emergency response communications system, it may include less power outlets. The power lugs (78) may provide a primary source of output for the emergency response communications system. It may include a primary overload protector (28), a master power switch (8), and a reset (29) to reset the primary overload protector (28). It may also include a battery condition indicator (6), a light (5), and a switch (7). The power connector port (40), described in the other units, may be used as a power outlet and could include the latching multi-pronged port arrangement. Naturally, it could also be used as a power inlet, for instance, to recharge the battery (10) through the power-recharging circuit (25). The power-recharging circuit (25) could include its own overload protector.

FIG. 16 shows details of the latching multi-pronged port (192) that has been described in connection with the radio connection ports and the power connector port. The female connector (194) may be the portion typically mounted in the portable emergency response communications system. It may be made of sturdy construction such as cast aluminum in part that may endure such extremes as arctic and desert conditions. It may have a weather shield cover (196) that may be dust resistant and could be water resistant. The multi-pronged port, located here with the weather shield cover (196), may have a female latching indent (198) to retain the male end into the female connector. The female prong assembly (199) may be part of the main body of the female connector (194) or it may be removable as shown. The female prong assembly may have a positive path (200) and a negative path (202) which may be electrically connected to the positive prong (204) and negative prong (206) respectively. (As would be known to those in the art, the negative could come from a variety of sources such as a ground through other than the multi-pronged port.) The prongs may be made of electrically conductive materials such as brass or aluminum or other suitable and durable materials. Naturally, other materials may be used. In the preferred embodiment, the prongs may be split along the length of the prong to assist in maintaining contact with the mating male part. The female prong assembly may have an female prong assembly orientation element (208). This orientation element may assist in orienting the female prong assembly (199) into its respective female housing (219). A similar arrangement could be made from the male housing (215) and the male prong assembly (217) using the male prong assembly orientation element (216). Naturally, this orientation element could be a variety of embodiments and could be connected to other parts of the female connector (194).

An orientation element of the preferred embodiment may be the female portion of an indented groove in the female connector (194), particularly in the female housing (219). The male connector (212) may correspond to the female connector (194). For instance, the male housing orientation element (222) could correspond to a female groove in the female housing (219) to allow such orientation. As another example, the male prong assembly (217) may have a positive prong receptacle (218) and a negative prong receptacle (220) to correspond with the positive prong (204) and the negative prong (206) in the female connector (194). Naturally, different combinations could occur on the orientation element. The principal advantage of an orientation element is that it may allow a repetitive and easy connection between the negative and positive terminals in a correct sequence to prevent cross polarization even under adverse conditions such as nighttime. To correspond with the female latching indent (198) of the female connector (194), a male latching indent (214) may be useful. This may also be made out of some durable and sturdy material such as cast aluminum or other materials. As mentioned earlier, the female connector (194) may be generally mounted to the emergency response communications system.

While the prongs may be on the female side of the connection, the term multi-pronged port should specifically include being on the male side as an alternative. Also, the female connector could have a prong and a prong receptacle and the male connector could have the oppositely corresponding prong receptacle and prong. In such an instance, the orientation element might be incorporated into the very arrangement of the corresponding prong-prong receptacle to the prong receptacle-prong. Other variations are possible. Also, the description of the present system includes the negative and positive being typically in the same connector—however, it is possible to separate the negative and positive into two separate connectors and be within the goals and purposes for the present invention and within the scope of the term multi-pronged port herein.

The male connector may be supplied with the unit to attach to the various power needs such as an HF radio, a 2 meter mobile radio, a power recharging source, and so forth. When the male connector (212) is inserted to the female connector (194), the female latching indent (198) may connect to the male latching indent (214) and restrain the male connector (212) from accidentally becoming disconnected from the female connector (194). With such a positive connection, there would be little chance of the radio becoming accidently disconnected during transmission or receiving even under adverse conditions. This appears to be a problem among many portable units. The present invention uses such a connector to substantially avoid such an occurrence. Likewise, in keeping with the general intent of the present invention, the latching multi-pronged port connectors are designed to be rugged and durable. While plastics could be used, it is felt that in the preferred embodiment for emergency response communications systems, the connectors may preferably be made from more durable materials in order to lessen the chance of failure under emergency conditions.

FIG. 17 illustrates an embodiment of the emergency response communications systems (2a) and (2b) of FIG. 8 in use. For instance, the system may be stored in a home with the radio connected for various monitoring and transmitting purposes. The battery charger (170) may be plugged into the power connector port (40) to maintain the emergency response communications system in a charged state. If an emergency develops, the charger may simply be unplugged, and the radio and emergency response communications system carried to the emergency site. As shown in this Figure, the female connector (194) is mounted into the case while the male connector (212) may be attached to the battery charger output. Also shown is an HT radio (34) that may be plugged into the HT radio port (36). In this embodiment, the computer power source outlet (42) may be the same as the HT radio port (36). Various other radios and equipment can concurrently be connected. Thus, even with the charger connected and the HT radio port in use, a user of the emergency response communications system could still have access to two other power ports for other radios. This might include, for instance, the HF radio port (32) and the 2 meter mobile radio port (38).

FIGS. 18 and 19 show a possible embodiment of the more compact portable emergency response communications systems shown in FIG. 8. For instance, it may be useful to have an antenna mounted on the unit. An HT radio may have its own antenna; however, its range may be extended with a longer antenna. The 2 meter mobile radio generally requires a larger antenna. Thus, it could need a separate antenna. With a separate antenna, the usefulness of the emergency response communications system may be even further enhanced. A mount could be made similar to the larger mobile unit in FIG. 1 such that the antenna could be removed or rotated into a storage position. Alternatively, as the embodiment shown in FIGS. 18 and 19, the antenna could be a retractable antenna. The antenna (72) may be mounted to the case as shown. Alternatively, it could be mounted internal to the case, or even could be some magnetically coupled connection. (Obviously, it would have necessary wiring to connect to the antenna connector of the radio.) The antenna could be sized to a certain length (W) when it is extended such that it could be properly tuned for the particular radio frequency. The mount (74) could be removably attached, substantially permanently attached, magnetically attached, and so forth as would be known to those skilled in the art. In a retracted position, shown in FIG. 19, the antenna (72) could be coiled up in the mount (74). This may be analogous to the common carpenter's measuring tape with the ability to retract and extend (designated herein as "recoiling"). For instance, the antenna could variably recoil to certain extended lengths that could tune to a variety of radio frequencies as the radio or radios might use. Naturally other antenna mounts could be envisioned. For instance, another embodiment might be a retractable segmented antenna that could be folded to a compact size. An object is that the range of even the smaller portable emergency response communications systems may be extended by the use of a mounted antenna and may offer additional flexibility to the system's use as the market may direct.

Each of these portable emergency response communications system embodiments could include various facets of the present invention. Some may include mobile elements, while others may not include such elements. Some may include attached antenna mounts, while others may rely upon other antenna configurations. Naturally, other variations could include aspects as have been described above, including lights, mega-DC power, the particular number of radio connection ports and power outlet or outlets, and so forth. The market place and manufacturing concerns may dictate the appropriate embodiments for the present invention.

The foregoing discussion and the claims that follow describe only the preferred embodiments of the present invention. Particularly with respect to the claims, it should be understood that a number changes may be made without departing from the essence of the present invention. In this regard, it is intended such changes—to the extent that they substantially achieve the same results in substantially the same way—will still fall within the scope of the present invention.

Although the methods relating to the system have been discussed in various detail, only initial claims directed toward the preferred embodiments have been included. Naturally, those claims could have some application to the various other methods and apparatus claimed throughout the patent. The disclosure of the system or method context is sufficient to support the full scope of methods and apparatus claims with, for instance, the hand disconnectable radio connection ports, to various embodiments of the power systems, the mega-DC power system, the selected charge controller, retractable antenna, and other aspects. While these may be added to explicitly include such details, the existing claims may be construed to encompass each of the general aspects. Without limitation, the present disclosure should be construed to include the subclaims, some of those in a system or method context as described above for each of the other general aspects. In addition, to the extent any revisions utilize the essence of the invention, each would naturally fall within the breadth of protection encompassed by this patent. This is particularly true for the present invention since its basic concepts and understandings may be broadly applied.

It is simply not practical to describe in the claims all the possible embodiments to the present invention which may be accomplished generally in keeping with the goals and objects of the present invention in this disclosure and which may include separately or collectively such aspects as providing a portable emergency response communications system as described above, allowing a more universal and hand disconnectable radio connection port, providing mega-DC power systems for a portable emergency response communications system, selectively charging through a selected charge controller to a portable emergency response communications system, and retracting the antenna. While these may be added to explicitly include such details, the existing claims should be construed to encompass such aspects. To the extent the method claimed in the present invention are not fully discussed, they are natural outgrowths of the system or apparatus claims. Therefore, separate and further discussion of the methods are deemed unnecessary as they otherwise claim steps that are implicit in the manufacture of the system or the apparatus claims. Furthermore, the steps are organized in a more logical fashion; however, other sequences can and do occur. Therefore, the method claims should not be construed to include only the order of the sequence of the steps presented.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical disclosed should be understood to encompass a disclosure of the action which that physical element facilitates. As an example regarding this last aspect, the disclosure of the act of "controlling" should be understood to encompass disclosure of a "controller"—whether explicitly discussed or not—and, conversely, where there is only a disclosure of a "controller", such a disclosure should be understood to encompass the act of "controlling." Such changes and alternative terms are to be understood to be explicitly included in the description.

Furthermore, any references mentioned in the application for this patent, as well as all references listed in any information disclosure originally filed with the application, are hereby incorporated by reference in their entirety to the extent such may be deemed essential to support the enablement of the invention(s). However, to the extent the statements might be considered inconsistent with the patenting of this/these invention(s), such statements are expressly not to be considered as made by the applicant(s).

I claim:

1. A portable emergency response communications system comprising:
  a. a power system comprising:
    i. a battery condition indicator;
    ii. a master power switch;
    iii. at least one portable DC battery containing DC power;
    iv. circuitry adapted to deliver said DC power;
    v. an impact resistant case adapted to withstand a substantial impact load to protect said DC battery;
  b. a frame adapted to support said power system comprising:
    i. a power system support;
    ii. a holding element adapted to hold said power system to said frame;
    iii. a first upright member rotatably connected to said power system support;
    iv. a second upright member rotatably connected to said power system support;
    v. at least one frame securing element adapted to secure said first upright member with said second upright member in at least a raised first position and a lowered second position;
    vi. at least one radio support shelf adapted to support at least one radio and mounted to said frame; and
    vii. at least one antenna mount connected to said frame and adapted for a radio;
  c. a light adapted to illuminate at least a portion of said frame;
  d. at least one radio connection port comprising:
    i. a latching multi-pronged port;
    ii. a weather shield cover, and
    iii. an orientation element;
  e. a battery charger responsive to said frame;
  f. a DC to AC inverter; and
  g. a mobile element connected to said frame adapted to enable movement of said frame with said power system wherein said power system, said frame, said light, said radio connection ports, said battery charger, said inverter, and said mobile element combine to form an impact resistant, portable emergency response communications system.

2. A portable emergency response communications system as described in claim 1 wherein said frame securing element comprises a locking slip ring and adapted to slidably engage said first upright member with said second upright member.

3. A portable emergency response communications system as described in claim 1 further comprising a plurality of antennas mounted to a plurality of said antenna mounts.

4. A portable emergency response communications system as described in claim 1 further comprising a solar recharging system.

5. A portable emergency response communications system as described in claim 1 wherein said antenna mount comprises a folding antenna mount.

6. A portable emergency response communications system as described in claim 1 further comprising a retractable antenna mounted to said antenna mount.

7. A portable emergency response communications system as described in claim 1 further comprising jumper cables electrically attached to said DC power supply and adapted to charge said power supply.

8. A portable emergency response communications system as described in claim 1 further comprising at least one cigarette lighter type power outlet adapted to supply power.

9. A portable emergency response communications system as described in claim 1 further comprising a mounted portable repeater.

10. A portable emergency response communications system as described in claim 1 wherein said mobile element comprises wheels.

11. A portable emergency response communications system as described in claim 1 wherein said mobile element comprises sled runners.

12. A portable emergency response communications system comprising:
   a. a power system comprising:
      i. a battery condition indicator;
      ii. a master power switch;
      iii. at least one portable DC battery containing DC power;
      iv. circuitry adapted to deliver said DC power;
      v. an impact resistant case adapted to withstand a substantial impact load to protect said DC battery;
   b. a frame adapted to support said power system comprising:
      i. a power system support;
      ii. a holding element adapted to hold said power system to said frame;
      iii. at least one radio support shelf adapted to support at least one radio and mounted to said frame; and
      iv. at least one antenna mount connected to said frame and adapted for a radio;
   c. a light adapted to illuminate at least a portion of said frame;
   d. at least one radio connection port comprising:
      i. a latching multi-pronged port;
      ii. a weather shield cover; and
      iii. an orientation element;
   e. a battery charger responsive to said frame;
   f. a DC to AC inverter; and
   g. a mobile element connected to said frame adapted to enable movement of said frame with said power system
wherein said power system, said frame, said light, said radio connection ports, said battery charger, said inverter, and said mobile element combine to form an impact resistant, portable emergency response communications system.

13. A portable emergency response communications system comprising:
   a. a plurality of radio connection ports adapted to allow connection of a HT radio, a HF radio, and a 2 meter radio wherein at least a first and second of said radio connection ports comprise:
      i. a latching multi-pronged port;
      ii. a weather shield cover; and
      iii. an orientation element;
   b. a computer power source outlet adapted for a portable computer;
   c. a first overload protector adapted to protect one of said radio connection ports;
   d. a second overload protector adapted to protect a second of said radio connection ports;
   e. a third overload protector adapted to protect said computer power source outlet;
   f. a power indicator;
   g. a battery condition indicator;
   h. a master power switch;
   i. at least one portable gel cell DC battery containing DC power;
   j. a first power circuit from said portable gel cell DC battery to said master power switch;
   k. a primary overload protector located after said master power switch and before said first, second, and third overload protectors in a second power circuit connected to said first power circuit;
   l. a third power circuit connected to said second power circuit adapted to deliver power to at least one of said radio connection ports;
   m. a fourth power circuit connected to said second power circuit adapted to deliver power to said second of said radio connection ports;
   n. a fifth power circuit connected to said second power circuit adapted to deliver power to said computer power source outlet;
   o. a sixth power circuit connected to said battery condition indicator adapted to deliver power to said battery condition indicator;
   p. an impact resistant case adapted to withstand a substantial impact load to protect said DC battery; and
   q. a handle adapted to carry said impact resistant case
wherein said radio connection ports, said outlets, said power sources, said overload protectors, said power indicato, said battery condition indicator, said master power switch, said inverter, said gel cell DC battery, said case, and said circuitry combine to form an impact resistant, portable emergency response communications system.

14. A portable emergency response communications system as described in claim 13 further comprising a fax machine outlet.

15. A portable emergency response communications system as described in claim 13 further comprising a DC to AC inverter.

16. A portable emergency response communications system as described in claim 13 further comprising a lighted battery condition indicator.

17. A portable emergency response communications system as described in claim 13 wherein said gell cell DC battery is rated for at least 450 amp hours.

18. A portable emergency response communications system as described in claim 13 wherein said radio connection ports are hand disconnectable.

19. A portable emergency response communications system as described in claim 13 wherein said impact resistant case is adapted to withstand a 50 ft-lb impact over a 3 inch square area.

20. A portable emergency response communications system as described in claim 13 further comprising a retractable antenna mounted to said case.

21. A portable emergency response communications system as described in claim 13 further comprising a light mounted to said case and adapted to illuminate at least a portion of an area surrounding said case.

22. A portable emergency response communications system as described in claim 13 wherein said gel cell DC battery is adapted to power said radio connection ports, said outlets, and said power sources for at least a continuous period of 16 hours per day for 3 days.

23. A portable emergency response communications system comprising:
   a. a power system comprising a DC power source, an impact resistant case, and circuitry to deliver said DC power to a plurality of radio power outlets;
   b. a frame adapted to support said power system comprising:
      i. a power system support;
      ii. a first upright member responsive to said power system support;
      iii. a second upright member responsive to said power system support wherein said first upright member is adapted to slidably engage with said second upright member;

iv. at least one frame securing element adapted to secure said first upright member with said second upright member in at least a raised first position and a lowered second position;
v. at least one foldable radio support shelf adapted to support at least one radio and mounted to said frame;
vi. at least one antenna mount connected to said frame and adapted for a radio;
c. at least one radio connection port responsive to said frame; and
d. a mobile element connected to said frame adapted to enable movement of said frame with said power system wherein said frame is adapted to assist in orienting said shelf into a serviceable position at said first raised position and wherein said power system, said frame, said radio connection port, and said mobile element combine to form a portable emergency response communications system.

24. A portable emergency response communications system as described in claim 23 further comprising at least two foldable radio shelves and two antennas mounted to two said antenna mounts.

25. A portable emergency response communications system as described in claim 23 wherein said DC power source comprises a gel cell DC battery rated for at least 450 amp hours.

26. A method of using an emergency response communications system comprising:
a. using a frame supporting a DC power system and a radio at a location;
b. relocating a radio support shelf connected to said frame from a serviceable position to a storage position;
c. loosening a securing element from a raised first position on said frame;
d. arcuately moving a first upright member in an arc to a lowered second position on said frame in cooperation with a second upright member;
e. securing said first upright member at said lowered second position;
f. holding said frame in said lowered second position;
g. moving said frame with a mobile element connected to said frame;
h. relocating said frame to a new location;
i. loosening said securing element from said lowered second position;
j. arcuately raising through an arc said first upright member to said raised first position;
k. securing said first upright member to said raised first position;
l. relocating said radio support shelf from said storage position; and
m. commencing using said DC power system and said radio.

27. A method of using an emergency response communications system as described in claim 26 further comprising the step of folding at least one antenna mount into a folded position.

28. A method of using an emergency response communications system as described in claim 26 wherein said step of arcuately moving said first upright member in an arc further comprises the step of slidably moving said first upright member with respect to said second upright member.

29. A method of using an emergency response communications system as described in claim 26 wherein said radio shelf is rotatable and wherein said step of relocating said radio support shelf comprises the step of rotating said shelf.

30. A portable emergency response communications system comprising:
a. a plurality of radio connection ports adapted to allow connection of a plurality of radios;
b. an computer power source outlet adapted for a portable computer;
c. a printer power source outlet adapted for a computer printer;
d. at least one portable gel cell DC battery rated for mega-DC power;
e. an impact resistant case capable of resisting a substantial impact load to protect said DC battery; and
f. circuitry to deliver said DC power to said radio connection ports wherein said system is adapted to operate said ports and outlets simultaneously for a mega-extended period and wherein said radio connection ports, said power source, said DC battery, said case, and said circuitry combine to form a portable emergency response communications system.

31. A portable emergency response communications system as described in claim 30 wherein said portable gel cell DC battery is rated for at least 600 amp hours.

32. A portable emergency response communications system as described in claim 30 further comprising a cart to carry said portable emergency response communications system.

33. A portable emergency response communications system comprising:
a. a plurality of hand disconnectable radio connection ports adapted to allow connection of at least a HT radio, a HF radio, and a 2 meter radio and wherein at least one connection port comprises a cigarette lighter type port and wherein at least one other connection port comprises a latching multi-pronged radio connection port;
b. at least portable gel type DC battery containing DC power;
c. an impact resistant case capable of resisting a large impact load to protect said DC battery;
d. circuitry to deliver said DC power to said radio connection ports;
e. a voltage indicator electrically attached to said DC battery wherein said plurality of hand disconnectable radio connection ports, said DC battery, said impact resistant case, said circuitry, and said voltage indicator collectively form an impact resistant portable emergency response communications system.

34. A portable emergency response communications system comprising:
a. a plurality of radio connection ports adapted to allow connection of a plurality of radios;
b. an computer power source outlet adapted for a portable computer;
c. at least one portable DC battery;
d. an impact resistant case adapted to protect said DC battery;
e. circuitry to deliver said DC power to said radio connection ports; and
f. a recoiling retractable antenna wherein said radio connection ports, said power source, said DC battery, said case, said circuitry, and said recoiling retractable antenna combine to form a portable emergency response communications system.

35. A portable emergency response communications system as described in claim 34 wherein said recoiling retractable antenna comprises a tunable antenna for a variety of frequencies.

36. A portable emergency response communications system as described in claim 34 wherein said battery comprises a portable gel cell DC battery rated for mega-DC power.

37. A portable emergency response communications system as described in claim 34 wherein said portable DC battery is rated for at least 450 amp hours.

38. A portable emergency response communications system as described in claim 34 further comprising a cart to carry said portable emergency response communications system.

* * * * *